US011712796B2

United States Patent
Yokoyama et al.

(10) Patent No.: US 11,712,796 B2
(45) Date of Patent: Aug. 1, 2023

(54) ROBOT THAT ACTS COMICALLY, AND STRUCTURE THEREOF

(71) Applicant: GROOVE X, Inc., Tokyo (JP)

(72) Inventors: Tomoaki Yokoyama, Tokyo (JP); Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 567 days.

(21) Appl. No.: 16/817,615

(22) Filed: Mar. 13, 2020

(65) Prior Publication Data
US 2020/0206904 A1 Jul. 2, 2020

Related U.S. Application Data

(63) Continuation of application No. PCT/JP2018/034091, filed on Sep. 14, 2018.

(30) Foreign Application Priority Data

Sep. 15, 2017 (JP) ................. 2017-177267

(51) Int. Cl.
*B25J 9/00* (2006.01)
*B25J 9/12* (2006.01)
(Continued)

(52) U.S. Cl.
CPC .............. *B25J 9/0009* (2013.01); *B25J 9/12* (2013.01); *B25J 9/1633* (2013.01); *B25J 11/003* (2013.01)

(58) Field of Classification Search
CPC ...... B25J 11/003; B25J 11/001; B25J 9/1633; B25J 9/12; B25J 9/0009; B25J 9/0051;
(Continued)

(56) References Cited

U.S. PATENT DOCUMENTS 6,565,371 B1   5/2003  Watanabe
10,507,576 B2 * 12/2019  Ilch ................. B25J 17/0266
(Continued)

FOREIGN PATENT DOCUMENTS

EP   2653281 A2 * 10/2013 ............... A63H 9/00
GB   2085399 A  *  4/1982 ........... B25J 17/0266
(Continued)

OTHER PUBLICATIONS

International Search Report in PCT/JP2018/034091, dated Dec. 18, 2018. 8pp.
(Continued)

*Primary Examiner* — T. Scott Fix
(74) *Attorney, Agent, or Firm* — Hauptman Ham, LLP

(57) ABSTRACT

A robot of one aspect includes a first base configuring a trunk portion, a second base configuring a head region, a connecting mechanism that connects the first base and the second base, and a drive unit that drives the connecting mechanism. The drive unit includes motors disposed on the first base. The connecting mechanism includes linking mechanisms that are disposed in parallel to each other and are driven by the motors respectively. Each linking mechanism includes a drive link fixed to a rotary shaft of the motor and a driven link that is connected to the drive link via a first joint and connected to the second base via a second joint. The first joint is a single axis hinge joint, and the second joint is a universal joint.

21 Claims, 16 Drawing Sheets

(51) Int. Cl.
*B25J 9/16* (2006.01)
*B25J 11/00* (2006.01)

(58) Field of Classification Search
CPC ...... B25J 9/0048; B25J 9/0045; B25J 9/0021; B25J 9/0003; B25J 1/12; B25J 9/047; B25J 9/0033; B25J 9/0036; B25J 9/0039; B25J 9/0042; B25J 9/105; B25J 11/0015; B25J 11/0005; A63H 13/005; A63H 29/24; A63H 29/22; B32B 1/00
USPC ...................................................... 74/490.03
See application file for complete search history.

(56) References Cited

U.S. PATENT DOCUMENTS

| | | | |
|---|---|---|---|
| 11,230,018 B2 * | 1/2022 | Hongo | B25J 9/0045 |
| 2003/0110540 A1 | 6/2003 | Fukui et al. | |
| 2004/0249510 A1 * | 12/2004 | Hanson | B25J 11/0015 |
| | | | 700/245 |
| 2010/0286828 A1 * | 11/2010 | Oh | A63H 3/365 |
| | | | 700/261 |
| 2012/0118097 A1 * | 5/2012 | Ilch | B25J 9/0078 |
| | | | 901/19 |

FOREIGN PATENT DOCUMENTS

| | | | | |
|---|---|---|---|---|
| JP | S60-34286 A | | 2/1985 | |
| JP | H1-69659 U | | 5/1989 | |
| JP | H8-229871 A | | 9/1996 | |
| JP | H11-33972 A | | 2/1999 | |
| JP | 2000-323219 A | | 11/2000 | |
| JP | 2001-293676 A | | 10/2001 | |
| JP | 2002178278 A | * | 6/2002 | |
| JP | 2003-117257 A | | 4/2003 | |
| JP | 2005-161438 A | | 6/2005 | |
| JP | 2012-40679 A | | 3/2012 | |
| JP | 2014-61571 A | | 4/2014 | |
| JP | 2014-76510 A | | 5/2014 | |
| JP | 2015-85486 A | | 5/2015 | |
| JP | 2018008318 A | * | 1/2018 | |
| KR | 100806126 B1 | * | 2/2008 | |
| KR | 20100006989 U | * | 7/2010 | |
| SE | 443943 B | * | 3/1986 | |
| WO | WO-2009038484 A1 | * | 3/2009 | ........... A63H 13/005 |
| WO | 2017050319 A1 | | 3/2017 | |

OTHER PUBLICATIONS

Office Action in JP Application No. 2019-542295, dated Nov. 19, 2019. 4pp.
Office Action in DE Application No. 112018005162.5, dated Feb. 27, 2023. 8pp.

* cited by examiner

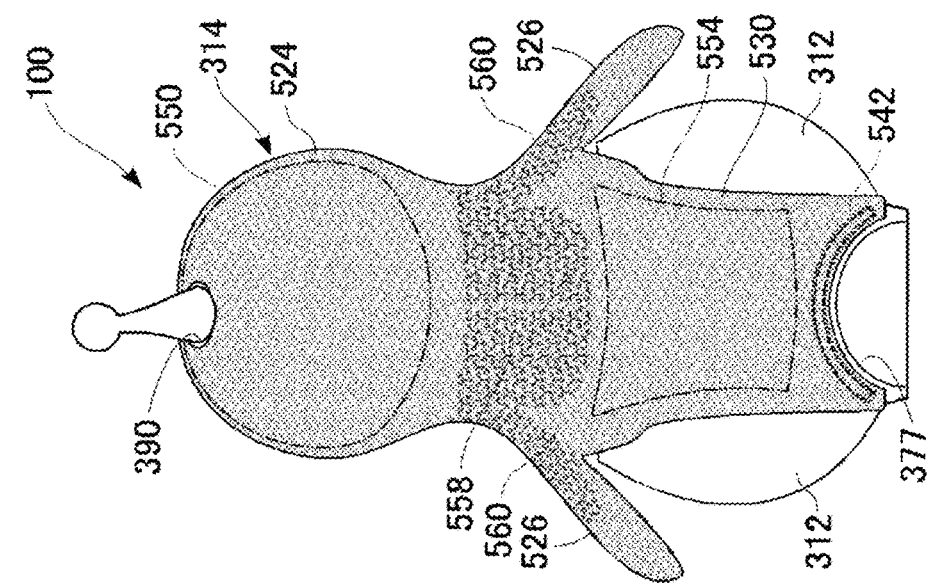
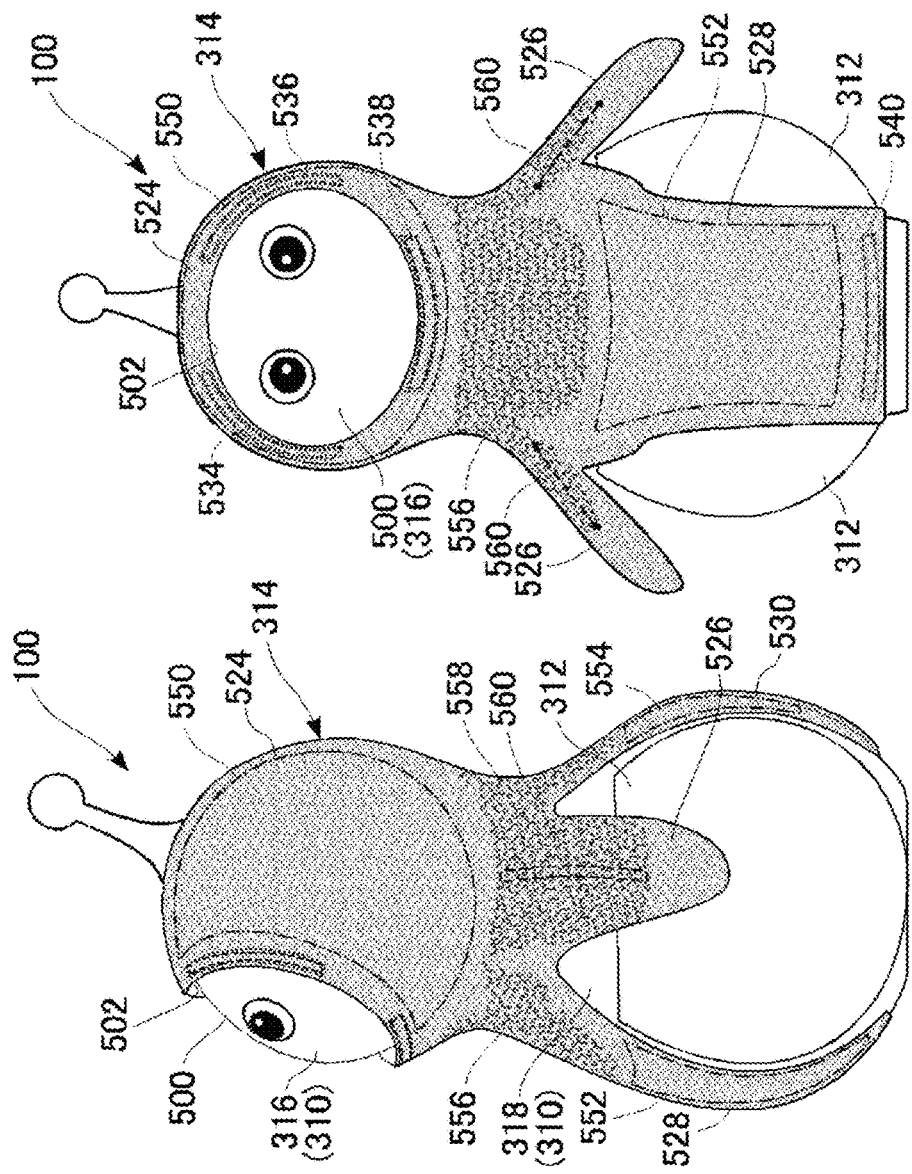

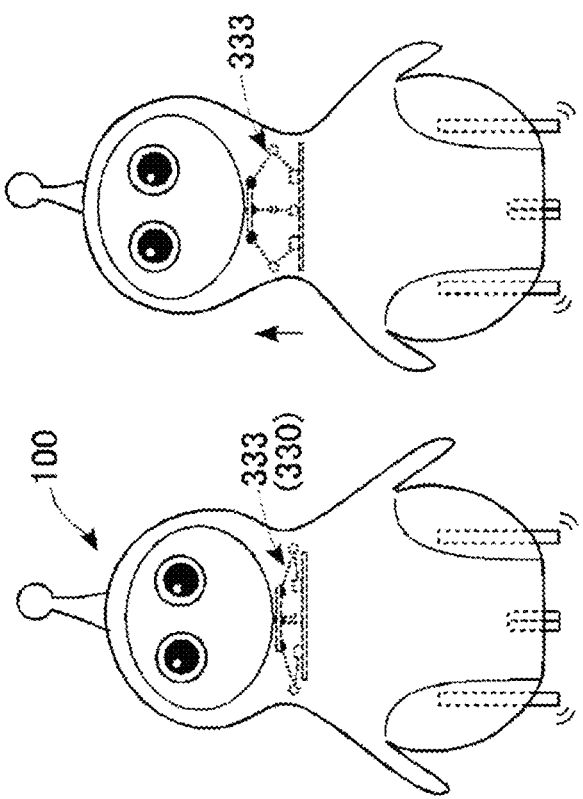

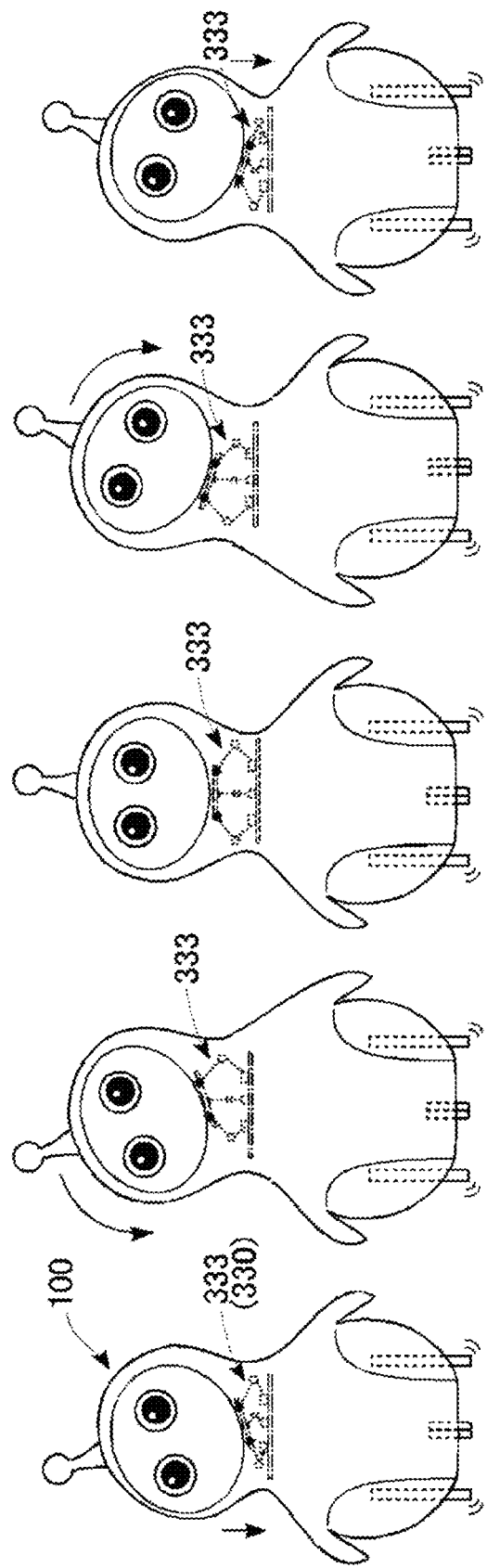

ROBOT THAT ACTS COMICALLY, AND STRUCTURE THEREOF

RELATED APPLICATIONS

The present application is a continuation of International Application No. PCT/JP2018/034091, filed Sep. 14, 2018, which claims priority from Japanese Application No. 2017-177267, filed Sep. 15, 2017, the disclosures of which applications are hereby incorporated by reference herein in their entirety.

TECHNICAL FIELD

The present invention relates to a structure for connecting two regions in a robot.

There have been advances in development of an autonomously acting robot, such as a humanoid robot or a pet robot, that provides interaction and solace for a human (for example, refer to Patent Document 1). This kind of robot is expected to cause behavior to evolve by learning autonomously based on a peripheral situation, and attain an existence close to that of a living being. In the near future, a robot might provide a user with the kind of solace evoked by a pet.

CITATION LIST

Patent Literature
  Patent Document 1: JP-A-2000-323219

SUMMARY OF INVENTION

Technical Problem

When developing this kind of robot, to what extent an expression, a gesture, or behavior of the robot can be made to appear cute, with no feeling of strangeness, is important. The inventor has arrived at a recognition that a comical movement of the robot can easily be realized by devising a structure of a connecting region in the robot.

The invention having been completed based on a recognition of the aforementioned problem, one object thereof is to realize a cute movement of a robot using a simple configuration.

Solution to Problem

An aspect of the invention is a robot wherein a first region and a second region are connected. The robot includes a first base configuring the first region, a second base configuring the second region, a connecting mechanism that connects the first base and the second base, and a drive unit that drives the connecting mechanism. The drive unit includes first to third actuators disposed on the first base. The connecting mechanism includes first to third linking mechanisms that are disposed in parallel to each other and are driven by the first to third actuators respectively. Each linking mechanism includes a drive link fixed to a rotary shaft of the actuator and a driven link that is connected to the drive link via a first joint and connected to the second base via a second joint. The first joint is a single axis hinge joint, and the second joint is a universal joint.

Another aspect of the invention is also a robot. The robot includes a connecting mechanism that connects a head portion and a trunk portion, an actuator that drives the connecting mechanism, and a control unit that controls the actuator. The control unit can execute, simultaneously or consecutively, a first control of driving in a direction causing the head unit to approach or move away from the trunk portion and a second control of causing the head portion to pivot around a roll shaft perpendicular to the aforementioned direction.

Still another aspect of the invention is a linking structure. The linking structure includes a first base, a second base, a connecting mechanism that connects the first base and the second base, and a drive unit that drives the connecting mechanism. The drive unit includes first to third actuators disposed on the first base. The connecting mechanism includes first to third linking mechanisms that are disposed in parallel to each other and are driven by the first to third actuators respectively. Each linking mechanism includes a drive link fixed to a rotary shaft of the actuator and a driven link that is connected to the drive link via a first joint and connected to the second base via a second joint. The first joint is a single axis hinge joint, and the second joint is a universal joint.

Still another aspect of the invention is a robot wherein a first region and a second region are connected. The robot includes a first base configuring the first region, a second base configuring the second region, a connecting mechanism that connects the first base and the second base so as to be able to approach and move away from each other, a drive unit that drives the connecting mechanism, and an outer skin that is caused to cover the first region and the second region while covering the connecting mechanism from an outer side, and has elasticity in at least a position corresponding to the connecting mechanism.

Advantageous Effects of Invention

According to the invention, a distinctive movement of a robot can be realized using a simple configuration.

BRIEF DESCRIPTION OF DRAWINGS

FIGS. 12A to 12C are drawings representing a state wherein an outer skin is mounted on the robot.
FIGS. 14A to 14D are illustrations schematically representing an operation of the robot caused by a drive of the linking structure.

FIGS. 15A to 15E are illustrations schematically representing an operation of the robot caused by a drive of the linking structure.

DESCRIPTION OF EMBODIMENTS

Figure 1A:
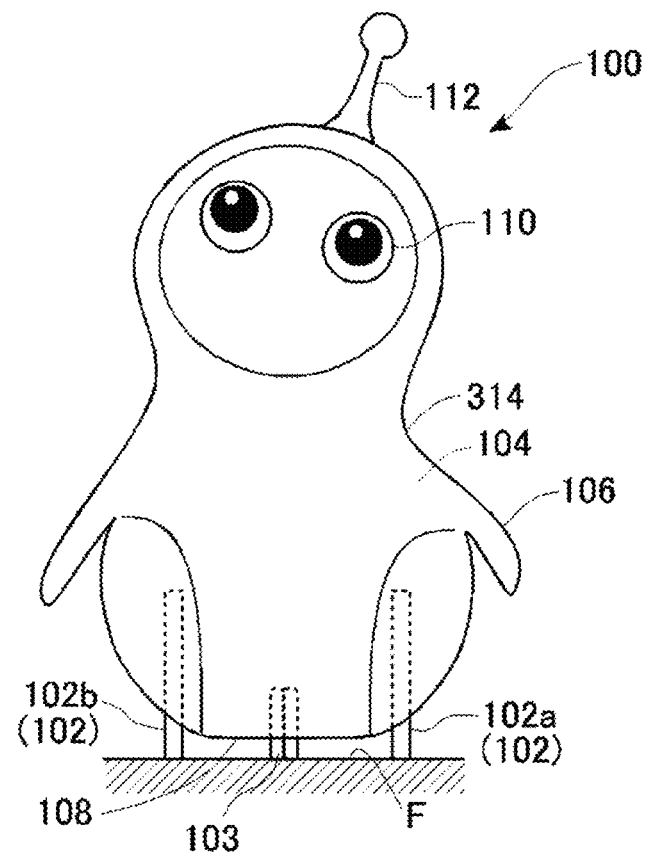
FIGS. 1A and 1B are drawings representing an external view of a robot according to an embodiment.

Hereafter, an embodiment of the invention will be described in detail, with reference to the drawings. For the sake of convenience, a positional relationship between structures may be expressed with a state shown in the drawings as a reference in the following description. Also, in the following embodiment and modified examples thereof, the same reference signs are allotted to components that are practically identical, and a description thereof is omitted as appropriate.

Figure 1B:
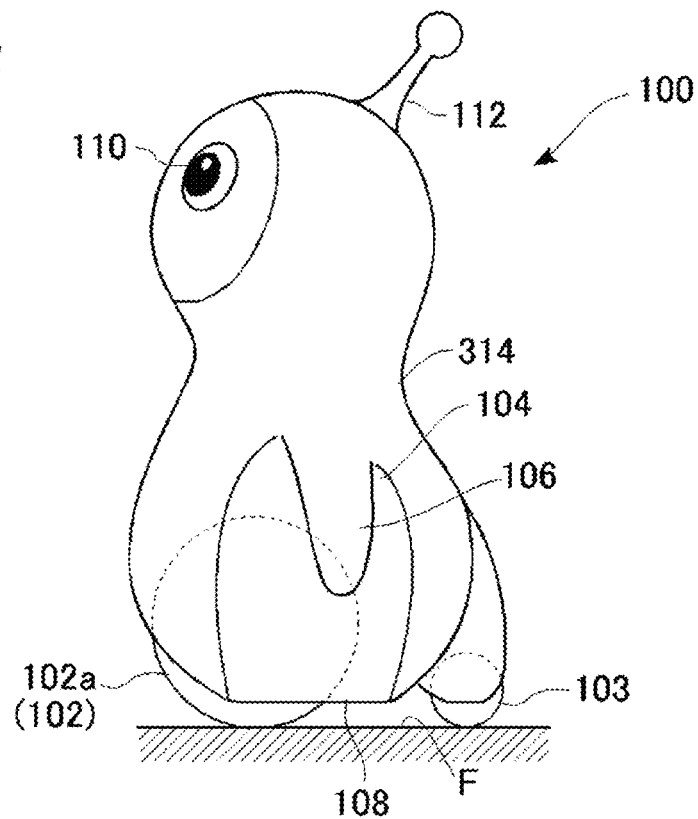

FIGS. 1A and 1B are drawings representing an external view of a robot 100 according to the embodiment. FIG. 1A is a front view, and FIG. 1B is a side view.

The robot 100 is an autonomously acting robot that determines an action or a gesture based on an external environment and an internal state. The external environment is recognized using various kinds of sensor, such as a camera or a thermosensor. The internal state is quantified as various parameters that express emotions of the robot 100.

With indoor action as a precondition, the robot 100 has, for example, an interior of an owner's home as an action range. Hereafter, a human involved with the robot 100 will be called a "user".

A body 104 of the robot 100 has a rounded form all over, and includes an outer skin 314 formed of a soft material having elasticity. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and still more preferably 5 kilograms or less. A height of the robot 100 is 1.2 meters or less, or preferably 0.7 meters or less. A user can hold the robot 100 with an effort practically equivalent to that of holding a very young baby.

The robot 100 includes three wheels for three-wheeled traveling. As shown in the drawing, the robot 100 includes a pair of front wheels 102 (a left wheel 102a and a right wheel 102b) and one rear wheel 103. The front wheels 102 are drive wheels, and the rear wheel 103 is a driven wheel. Rotational speeds and directions of rotation of the front wheels 102 can be individually controlled. The rear wheel 103 rotates freely in order to cause the robot 100 to move forward and back, and left and right.

The front wheels 102 and the rear wheel 103 can be completely housed in the body 104 using an unshown drive mechanism (a pivoting mechanism and a linking mechanism). A greater portion of each wheel is hidden by the body 104 when traveling too, but when each wheel is completely housed in the body 104, the robot 100 is in a state of being unable to move. The body 104 descends, and sits on a floor surface F, in accompaniment to an operation of the wheels being housed. In the sitting state, a seating face 108 formed in a bottom portion of the body 104 comes into contact with the floor surface F.

The robot 100 has two arms 106. The arms 106 do not have a function of gripping an object. The arms 106 are capable of performing simple actions such as raising, waving, and oscillating by pulling or loosening an unshown incorporated wire. The two arms 106 can also be individually controlled.

Two eyes 110 are provided in a head portion front surface (a face) of the robot 100. The eye 110 is displayed in various expressive ways using a liquid crystal element or an organic EL element. The robot 100 incorporates a speaker, and is also capable of simple speech. A horn 112 is attached to an apex portion of the robot 100. A whole-sky camera is incorporated in the horn 112, and can film in all directions up and down and left and right at one time. Also, a high resolution camera (not shown) is provided in the head portion front surface of the robot 100.

Figure 2:
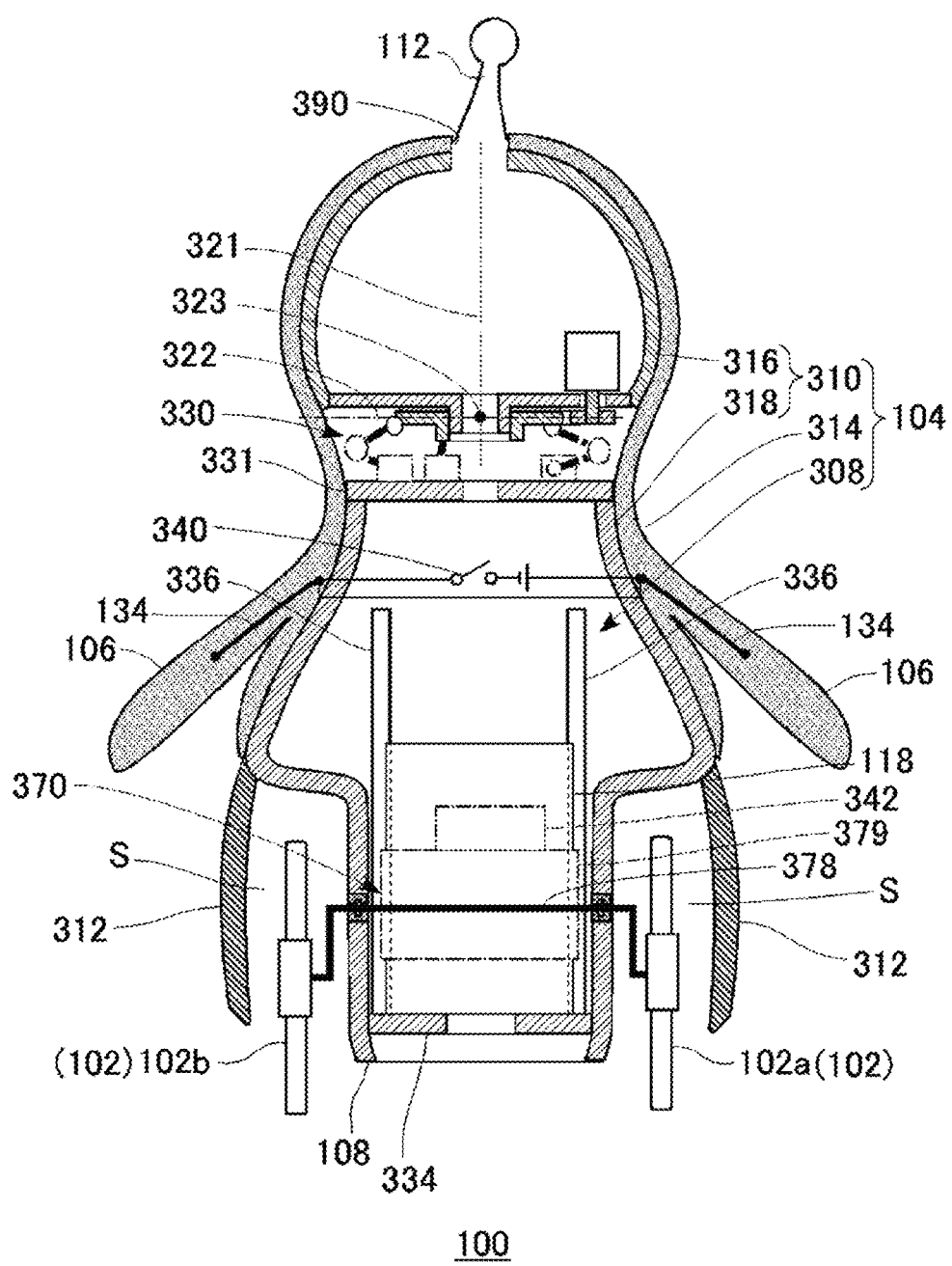
FIG. 2 is a sectional view schematically representing a structure of the robot.

FIG. 2 is a sectional view schematically representing a structure of the robot 100.

The body 104 includes a base frame 303, a main body frame 310, a pair of wheel covers 312, and the outer skin 314. The base frame 303 supports an internal mechanism together with configuring a shaft of the body 104. The base frame 308 is configured by a multiple of side plates 336 being installed vertically on a lower plate 334. A battery 118, a control circuit 342, various kinds of actuator, and the like, are housed inside the base frame 308.

The main body frame 310 includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. A lower end portion of the trunk portion frame 318 is fixed to the lower plate 334. The head portion frame 316 is connected to the trunk portion frame 318 via a linking structure 330.

The head portion frame 316 has a yaw shaft 321, a pitch shaft 322, and a roll shaft 323. A head shaking action is realized by a turning (yawing) of the head portion frame 316 around the yaw shaft 321, a nodding action, a looking up action, and a looking down action are realized by a turning (pitching) around the pitch shaft 322, and an action of tilting the head left and right is realized by a turning (rolling) around the roll shaft 323. A position and angle of each shaft in a three-dimensional space can change in accordance with a drive aspect of the linking structure 330. Details will be described hereafter.

The trunk portion frame 318 houses the base frame 308 and a wheel drive mechanism 370. The wheel drive mechanism 370 includes a front wheel drive mechanism that drives the front wheels 102 and a rear wheel drive mechanism that drives the rear wheel 103, and an actuator 379 that drives the drive mechanisms, and functions as a "movement mechanism" that causes the robot 100 to move. An upper half portion of the trunk portion frame 318 is of a smooth curved form so as to provide an outline of the body 104 with roundness. A lower half portion of the trunk portion frame 318 is of a small width in order to form a housing space S of the front wheel 102 between the front wheel 102 and the wheel cover 312, and supports a pivot shaft 378 of the front wheel 102.

The pair of wheel covers 312 are provided so as to cover the lower half portion of the trunk portion frame 318 from left and right. The wheel cover 312 forms a smooth outer face (curved face) continuous with the upper half portion of the trunk portion frame 318. An upper end portion of the wheel cover 312 is linked along a lower end portion of the upper half portion. Because of this, the housing space S, which is opened downward, is formed between the side wall of the lower half portion and the wheel cover 312.

The front wheel drive mechanism includes a rotary drive mechanism for causing the front wheel 102 to rotate and a housing operation mechanism for causing the front wheel 102 to enter and withdraw from the housing space S. The front wheel 102 can be driven to reciprocate between the housing space S and an exterior by a drive of the front wheel drive mechanism. The rear wheel 103 can be driven to reciprocate between the housing space S and the exterior by a drive of the rear wheel drive mechanism.

The outer skin 314 covers the main body frame 310 from an outer side. The outer skin 314 has a thickness of an extent such that a person feels elasticity, and is formed of a material having elasticity, such as urethane sponge. Because of this, a user feels a moderate degree of softness when hugging the robot 100, and can make natural physical contact, as a person does with a pet. A touch sensor of an electrostatic capacitance type is provided between the main body frame 310 and the outer skin 314. The touch sensor is provided in multiple places, and a touch can be detected in almost all regions of the robot 100. As the touch sensor is provided on an inner side of the outer skin 314, a detection level increases when the outer skin 314 is transformed. That is, a contact state such as whether a person is hugging the robot 100 tightly or gently can be determined. The arms 106 are formed integrally with the outer skin 314. An aperture portion 390 is provided in an upper end portion of the outer skin 314. A lower end portion of the horn 112 is connected to the head portion frame 316 via the aperture portion 390.

A drive mechanism for driving the arm 106 includes a wire 134 embedded in the outer skin 314, and a drive circuit 340 (energizing circuit) of the wire 134. The wire 134 is formed of a shape memory alloy line in the embodiment, contracts and hardens when heated, and relaxes and lengthens when allowed to cool. Leads drawn out from both ends of the wire 134 are connected to the drive circuit 340. When a switch of the drive circuit 340 is activated, the wire 134 (shape memory alloy line) is energized.

The wire 134 is molded or woven in so as to extend from the outer skin 314 to the arm 106. Leads are drawn from both ends of the wire 134 into the trunk portion frame 318. One wire 134 may be provided in each of a left and right of the outer skin 314, or a multiple of the wire 134 may be provided in parallel in each of the left and right of the outer skin 314. The arm (the arm 106) can be raised by energizing the wire 134, and the arm (the arm 106) can be lowered by interrupting the energization. Also, in another form, a wire may be attached in a vicinity of a leading end of the arm 106, a mechanism that winds the wire into the trunk, portion frame 318 provided, and the arm 106 driven by the length of the wire being adjusted by paying out and drawing in using the winding mechanism.

Figure 3A:
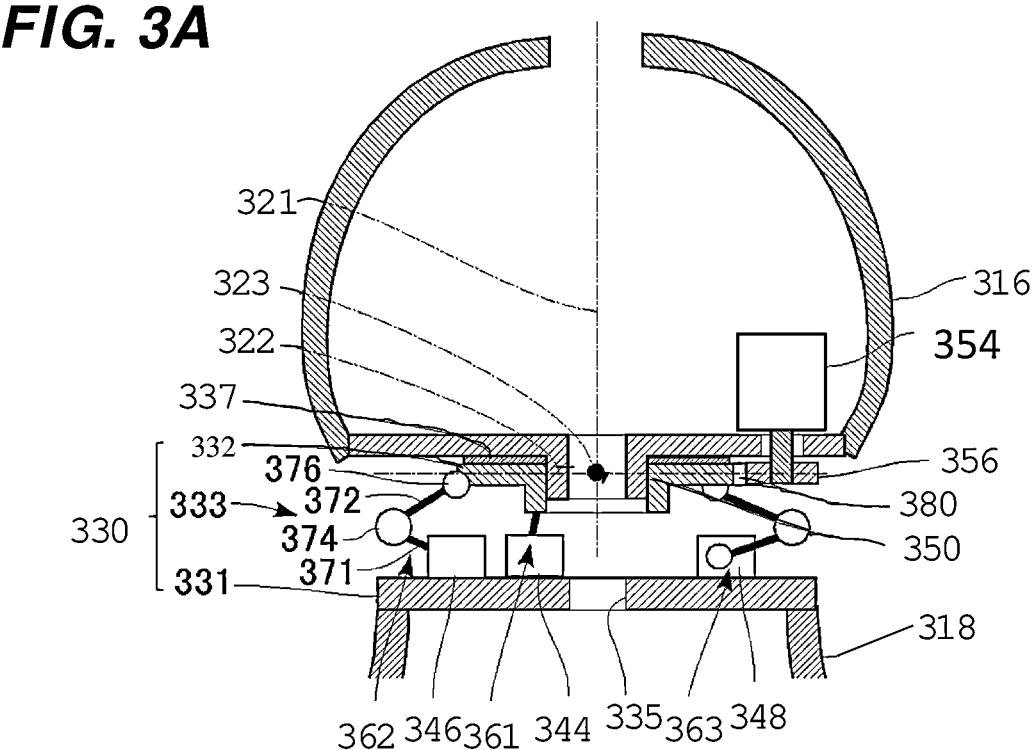
FIGS. 3A and 3B are illustrations representing a linking structure and a peripheral structure thereof.
Figure 3B:
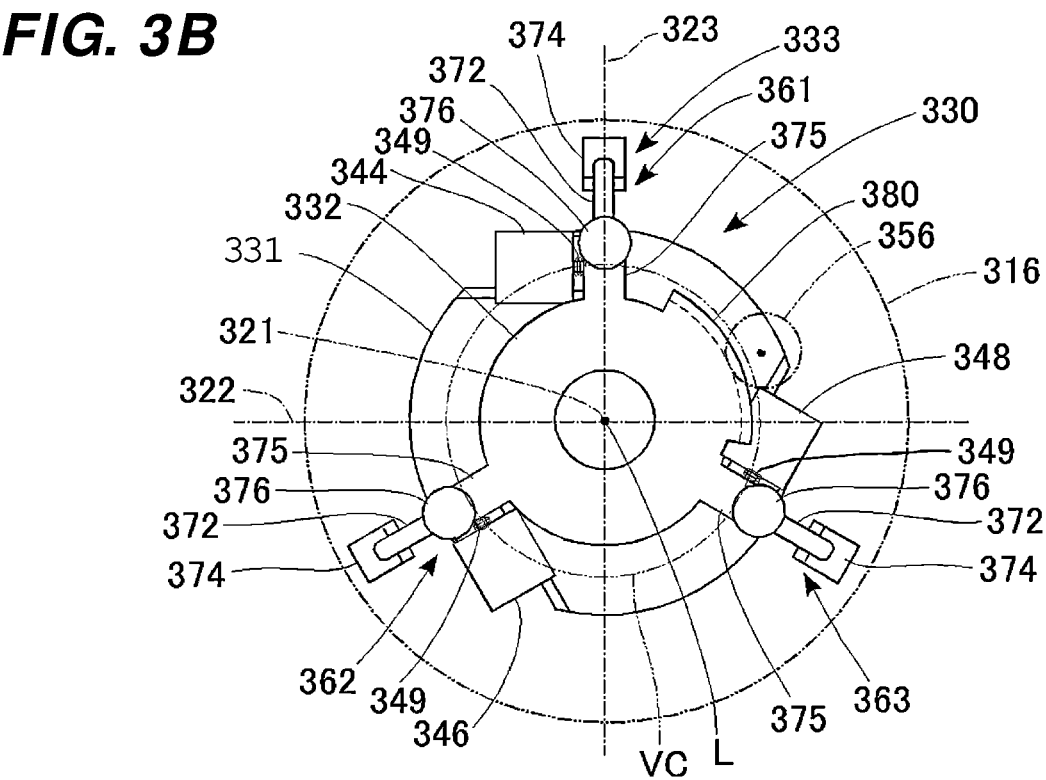
Figure 4A:
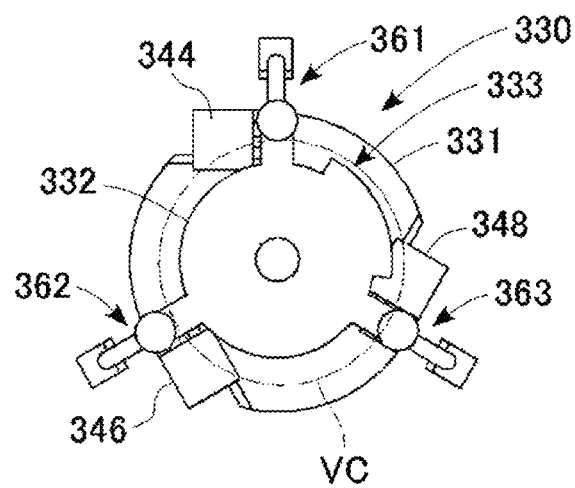
FIGS. 4A to 4D are illustrations exemplifying an operation of the linking structure.
Figure 4B:
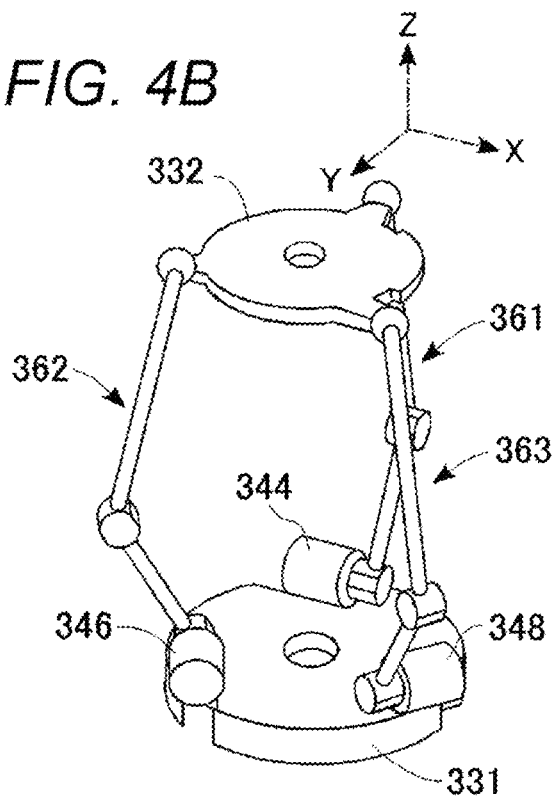
Figure 4C:
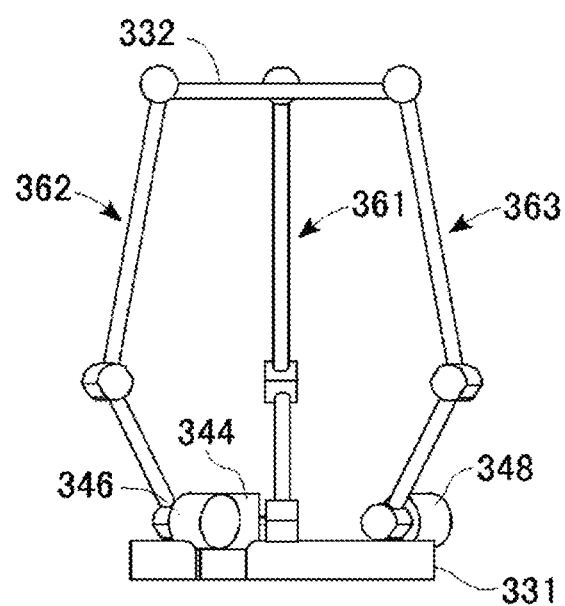
Figure 4D:
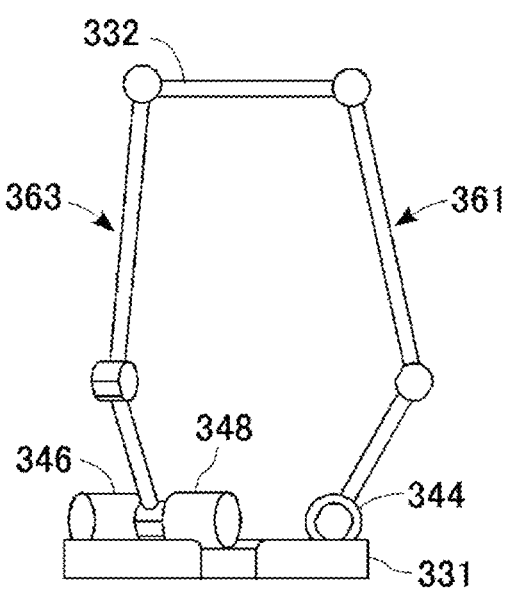
Figure 5A:
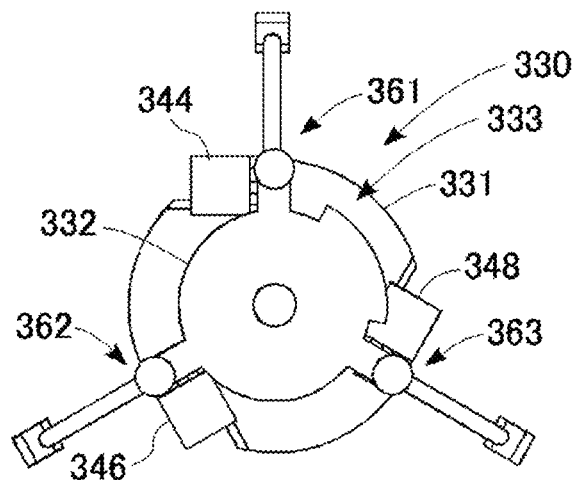
FIGS. 5A to 5D are illustrations exemplifying an operation of the linking structure.
Figure 5B:
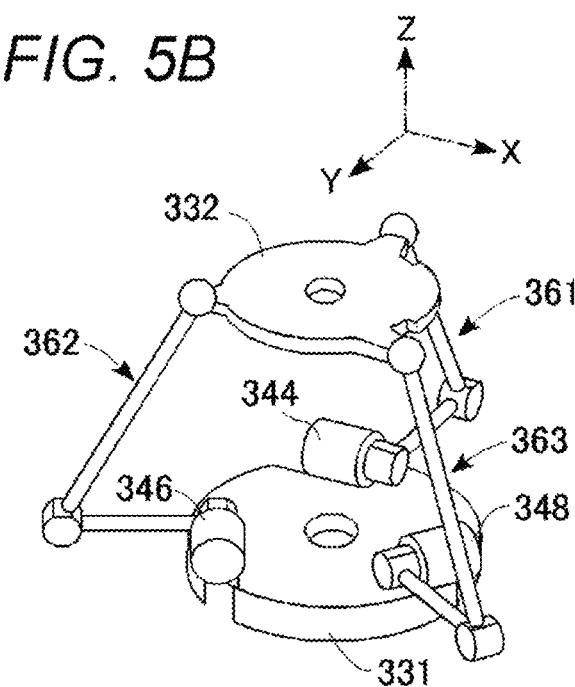
Figure 5C:
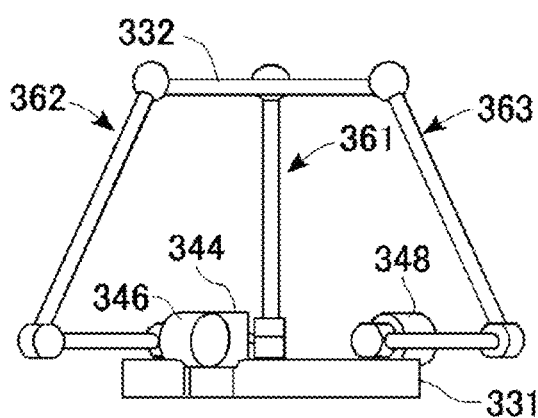
Figure 5D:
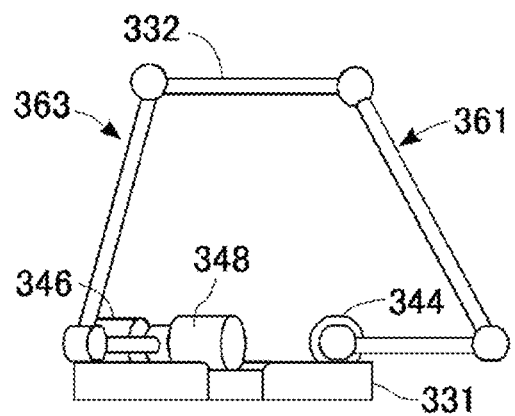
Figure 6A:
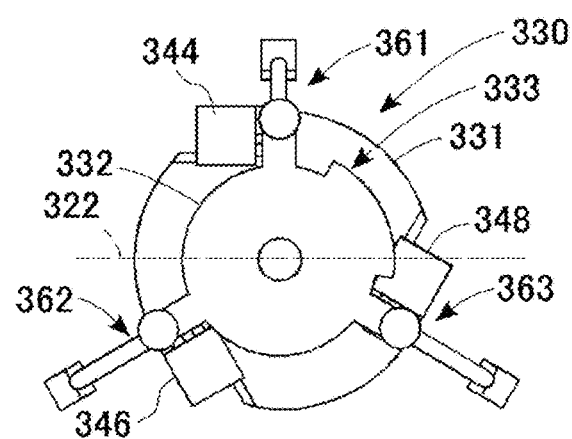
FIGS. 6A to 6D are illustrations exemplifying an operation of the linking structure.
Figure 6B:
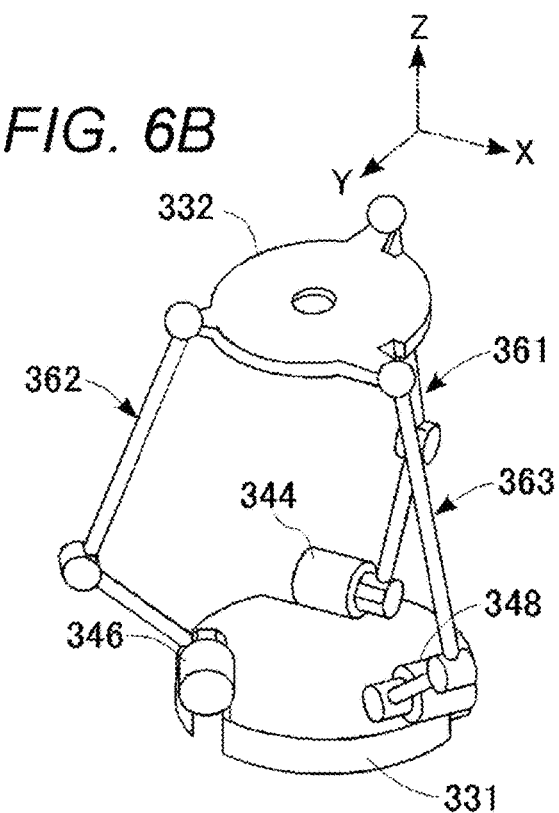
Figure 6C:
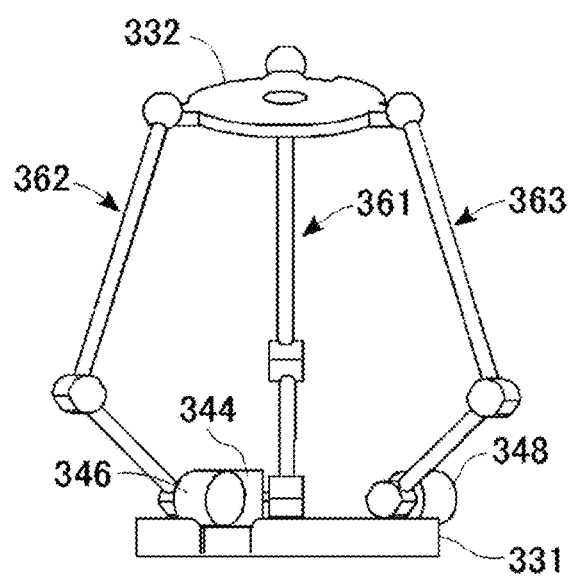
Figure 6D:
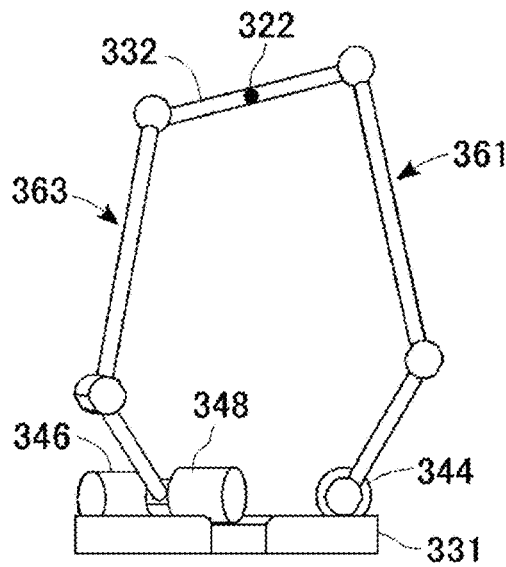
Figure 7A:
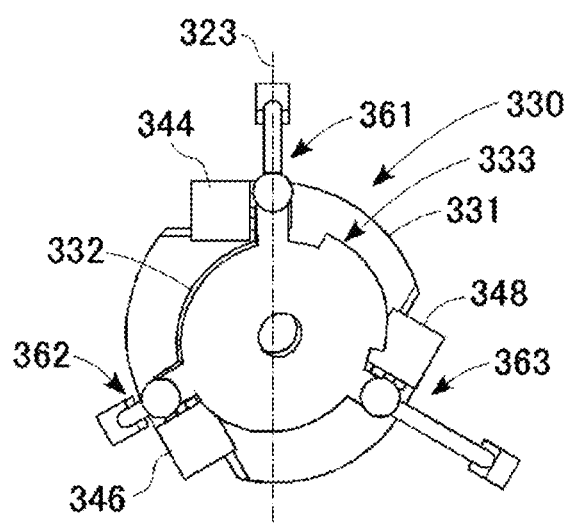
FIGS. 7A to 7D are illustrations exemplifying an operation of the linking structure.
Figure 7B:
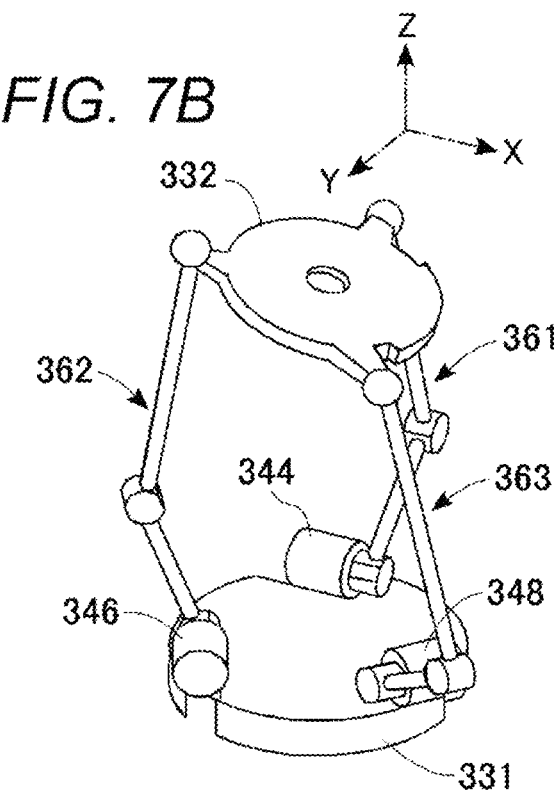
Figure 7C:
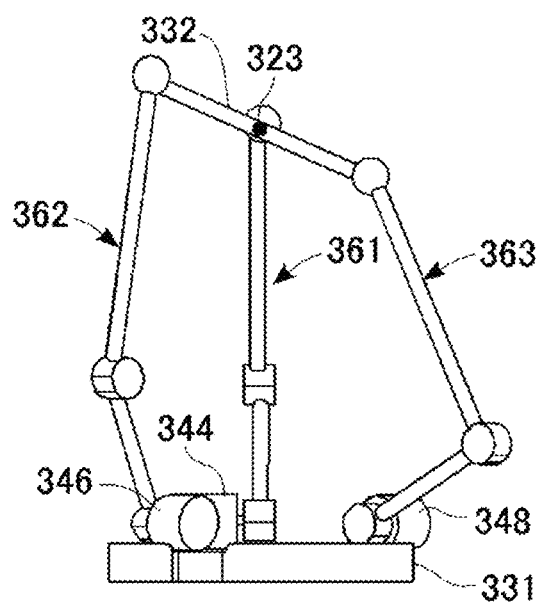
Figure 7D:
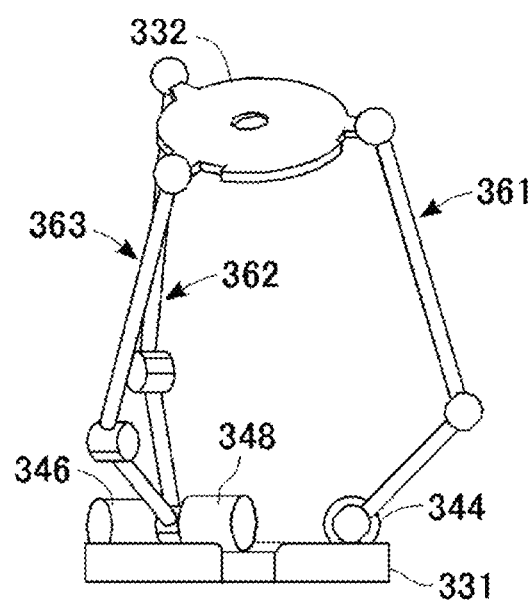

FIGS. 3A and 3B are illustrations representing the linking structure 330 and a peripheral structure thereof. FIG. 3A is an enlarged sectional view, and FIG. 3B is a plan view. As shown in FIG. 3A, the linking structure 330 includes a first base 331 configuring a trunk portion (a first region), a second base 332 configuring a head portion (a second region), and a connecting mechanism 333 connecting the two bases.

As shown in FIG. 3B, the first base 331 is of a disk form, and is fixed to an upper end portion of the trunk portion frame 318. The first base 331 is provided in parallel with the lower plate 334, and an insertion hole 335 for passing wiring through is provided in a center of the first base 331. Three motors (a first motor 344, a second motor 346, and a third motor 348) are installed on the first base 331 at equal intervals (every 120 degrees) on a virtual circle VC having an axial line L thereof as a center. The first motor 344 is positioned behind, the second motor 346 is positioned on a front right, and the third motor 348 is positioned on a front left of a central axis of the robot 100. The motors configure a "drive unit" that drives the connecting mechanism 333, and function as "first to third actuators" that realize a pitching and a rolling of the head portion by driving a linking mechanism to be described hereafter (to be described hereafter).

The second base 332 is of a stepped cylindrical form, and is connected coaxially to the head portion frame 316. An annular spacer 337 (a sliding bearing) is interposed between a bottom portion of the head portion frame 316 and the second base 332. The connecting mechanism 333 functions as a neck portion (a neck joint) that connects the head portion and the trunk portion of the robot 100.

A cylindrical pivot shaft 350 (a cylindrical shaft) that protrudes downward is provided in a center of the bottom portion of the head portion frame 316. The pivot shaft 350 is inserted coaxially through the second base 332. The pivot shaft 350 can pivot with respect to the second base 332 with the yaw shaft 321 as a center. A motor 354 is installed in a peripheral edge portion inside the head portion frame 316. A rotary shaft of the motor 354 penetrates the bottom portion of the head portion frame 316, and a gear 356 is provided on a leading end of the rotary shaft. The motor 354 functions as an "actuator" that realizes a yawing of the head portion.

The connecting mechanism 333 includes three linking mechanisms (a first linking mechanism 361, a second linking mechanism 362, and a third linking mechanism 363) capable of extending and contracting in an axial line direction of the trunk portion frame 318 (that is, a vertical direction), and can realize extending and contracting actions of the neck portion using extension and contraction of the linking mechanisms. The first linking mechanism 361 is connected to the first motor 344, the second linking mechanism 362 is connected to the second motor 346, and the third linking mechanism 363 is connected to the third motor 348.

Each linking mechanism is configured by a drive link 371 and a driven link 372 being connected in series, and the linking mechanisms are disposed parallel to each other. One end of the drive link 371 is fixed to a rotary shaft of the motor, and another end is connected to one end of the driven link 372 via a first joint 374. A coupling portion of the rotary shaft of the motor and the drive link 371 is positioned on the virtual circle VC. Another end of the driven link 372 is connected to the second base 332 via a second joint 376. The first joint 374 is a single axis hinge joint, and the second joint 376 is a universal joint. The drive link 371 may be fixed directly to the rotary shaft of the motor, or may be fixed via a speed reducer (a gear) or the like.

A pivot shaft (axial line) of the first joint 374 is assumed to be parallel to the rotary shaft of the motor. The second joint 376 is provided on a leading end of an arm portion 375 extended in a radial direction from the second base 332. According to this kind of configuration, the second base 332 can be driven in a vertical direction (a Z direction), and the second base 332 can be caused to pivot with the pitch shaft 322 or the roll shaft 323 as a center. That is, an extending and contracting action, a nodding action (a locking up/looking down action), a tilting action, and the like, of the neck can be realized. Details thereof will be described hereafter.

A load canceling torsion spring 349 is provided so as to be fitted onto the rotary shaft of each motor. One end side of the torsion spring 345 is fixed to a main body of the motor, and another end side is fixed to the drive link 371. Because of this, one portion of a load exerted by the head portion in a direction of gravity can be canceled, and the head portion can be maintained in a preset reference position even when the motor is in an off-state. In other words, there is no need to drive the motor in order to maintain the head portion in the reference position. An extending and contracting action of the neck can be realized by causing the head portion to rise or descend with respect to the reference position using a drive of the motor. As there is no need for the whole load exerted by the head portion to be received by the motor, a load (torque) of the motor can be reduced, and power consumption can be restricted.

Also, a gear 380 is provided in a predetermined range on an outer periphery of the second base 332, and meshes with the gear 356 of the motor 354. According to this kind of configuration, the head portion frame 316 can be caused to pivot with the yaw shaft 321 as a center by driving the motor 354 and a head shaking action can be realized.

Wires such as a power supply line extending from the battery 118 and a signal line extending from the control circuit 342 or the like are connected to an actuator of the head portion or the neck portion through the insertion hole 335 and the pivot shaft 350. This is owing to the motor 354, which carries out a yawing drive, being disposed in a peripheral edge portion rather than a center of the head portion. By the wires being extended along the axial line, the wires can be prevented or restricted from becoming tangled or impeding the operation, even when a head shaking action is carried out.

As a sufficient interval is secured in a vertical direction between the head portion frame 316 and the trunk portion frame 318, a large range of movability (range of rotation) of the head portion frame 316 centered on the pitch shaft 322 and the roll shaft 323 can be obtained.

In the embodiment, a vertical range of mobility of the head portion frame 316 centered on the pitch shaft 322 is taken to be 90 degrees, which is taken to be 45 degrees each upward and downward from a state wherein the line of sight of the robot 100 is horizontal. That is, a limit value of an angle at which the robot 100 faces upward (an angle of looking up) is 45 degrees, and a limit value of an angle at which the robot 100 faces downward (an angle of looking down) is −40 degrees.

Also, a horizontal range of mobility of the head portion frame 316 centered on the yaw shaft 321 is taken to be 80 degrees, which is taken to be 40 degrees each to the right and left from a state wherein the line of sight is oriented to the front. That is, a limit value of an angle at which the robot 100 faces right with respect to the front is 40 degrees, and a limit value of an angle at which the robot 100 faces left is −40 degrees.

Furthermore, an inclined range of mobility of the head portion frame 316 centered on the roll shaft 323 is taken to be 60 degrees, wherein an inclination is taken to be 30 degrees each to the right and left from a state wherein the head portion is held straight. That is, a limit value of the robot 100 tilting the head to the right side is 30 degrees, and a limit value of the robot 100 tilting the head to the left side is −30 degrees. The range of mobility around each shaft may be changed as appropriate in a modification.

FIGS. 4A to 4D to FIGS. 7A to 7D are illustrations exemplifying operations of the linking structure 330. FIGS. 4A to 4D show a state wherein the neck is extended, and FIGS. 5A to 5D show a state wherein the neck is contracted. FIGS. 6A to 6D show a state when carrying out a nodding action, and FIGS. 7A to 7D show a state when carrying out a head tilting action. In each drawing, A is a plan view, B is a perspective view, C is a front view, and D is a right side view. Hereafter, for the sake of convenience, an up-down direction of the robot. 100 in a three-dimensional space may be expressed as the Z direction, a right-left direction perpendicular thereto as an X direction, and a front-back direction as a Y direction.

As shown in FIGS. 4A to 4D, the motors 344 to 348 are disposed so as to be oriented in the same direction (the rotary shafts are positioned on the same side as seen from the main body of the motor) around the virtual circle VC. By the motors 344 to 348 being caused to rotate to the same angle in one direction, all of the linking mechanisms 361 to 363 can be extended equally, and the connecting mechanism 333 can be caused to extend. Because of this, the second base 332 can be caused to separate from the first base 331 while an orientation of the second base 332 remains constant, whereby an operation of extending the neck portion of the robot 100 can be realized.

Meanwhile, by the motors 344 to 348 being caused to rotate to the same angle in the opposite direction, all of the linking mechanisms 361 to 363 can be folded equally, and the connecting mechanism 333 can be caused to contract, as shown in FIGS. 5A to 5D. Because of this, the second base 332 can be brought into proximity with the first base 331 while the orientation of the second base 332 remains constant, whereby the neck portion of the robot 100 can be shortened. That is, an operation of causing the neck portion to extend or contract can be realized by causing the motors 344 to 348 to rotate in the same direction (the one direction or the opposite direction).

Also, by causing the first motor 344 to rotate in one direction and causing the second motor 346 and the third motor 348 to rotate in the opposite direction, the second base 332 can be caused to pivot centered on the pitch shaft 322 and incline forward, as shown in FIGS. 6A to 6D. Because of this, the head portion of the robot 100 can be caused to incline forward, whereby a nodding action or a looking down action can be realized. Although omitted from the drawing, a looking up action can be realized by causing the second motor 346 and the third motor 348 to rotate in the one direction and causing the first motor 344 to rotate in the opposite direction.

By causing the second motor 346 to rotate in one direction and causing the first motor 344 and the third motor 343 to rotate in the opposite direction, the second base 332 can be caused to pivot centered on the roll shaft 323 and incline to the left, as shown in FIGS. 7A to 7D. Because of this, an action of tilting the head portion of the robot 100 to the left side can be realized. Although emitted from the drawing, an action of tilting the head portion of the robot 100 to the right side can be realized by causing the third motor 343 to rotate in the one direction and causing the first motor 344 and the second motor 346 to rotate in the opposite direction.

It goes without saying that various actions wherein the aforementioned various kinds of action are combined (mixed), such as tilting the head while performing a looking up action, can be realized by adjusting a direction of rotation and a rotational speed of each of the motors 344 to 348.

The configuration of the linking structure 330 is such that the three linking mechanisms impose a restriction on each other's movements. Translational movement of the head portion is such that, essentially, only movement in the Z direction is tolerated, and movement, in the X direction and the Y direction is not tolerated (excepting slight displacement caused by tilting of the second base 332). This means that an action that appears biologically unnatural, such as the axis of the head portion moving in parallel with the axis of the trunk portion, can be prevented. This is owing to the first joint 374 of each linking mechanism being a single axis hinge joint, and an axis thereof being parallel to a motor axis.

Meanwhile, tilting of the head portion is tolerated around the pitch shaft 322 (a shaft parallel to the X axis) and the roll shaft 323 (a shaft parallel to the Y axis), which are displaced in accordance with a height of the head portion. This is owing to the second joint 376 of each linking mechanism being a universal joint.

As already described, pivoting of the head portion (a head shaking movement), is realized by a drive of the motor 354 installed on the second base 332. As the head portion frame 316 itself rotates with the second base 332 as a reference, the rotation is not restricted by an operation of the linking structure 330. That is, a head shaking action can be realized independently of an extending and contracting action of the neck portion, a nodding action, a head tilting action, or the like, and is an action in keeping with a movement of the skeletal structure of a living being.

Figure 8:
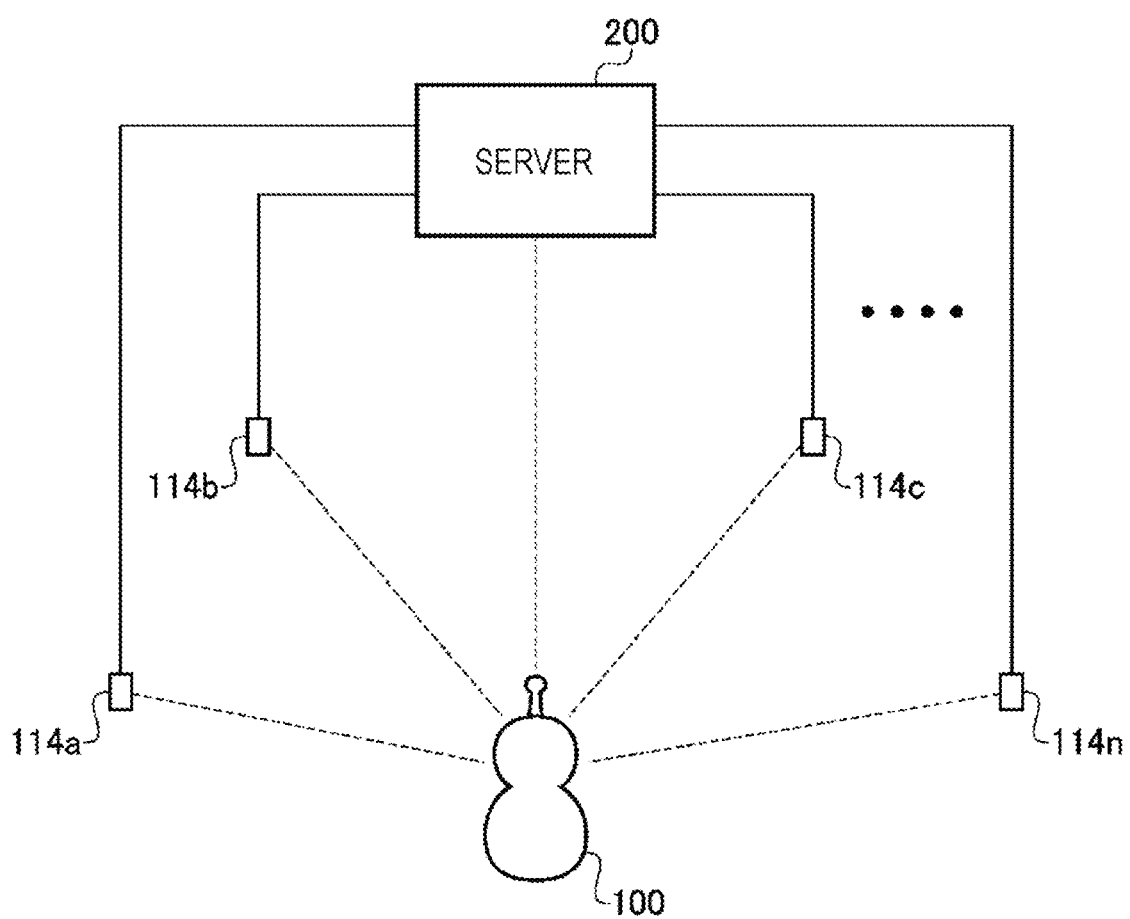
FIG. 8 is a configuration diagram of a robot system.

FIG. 8 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 determines a basic action of the robot 100 based on information obtained from the sensors incorporated in the robot 100 and the multiple of external sensors 114.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Figure 9:
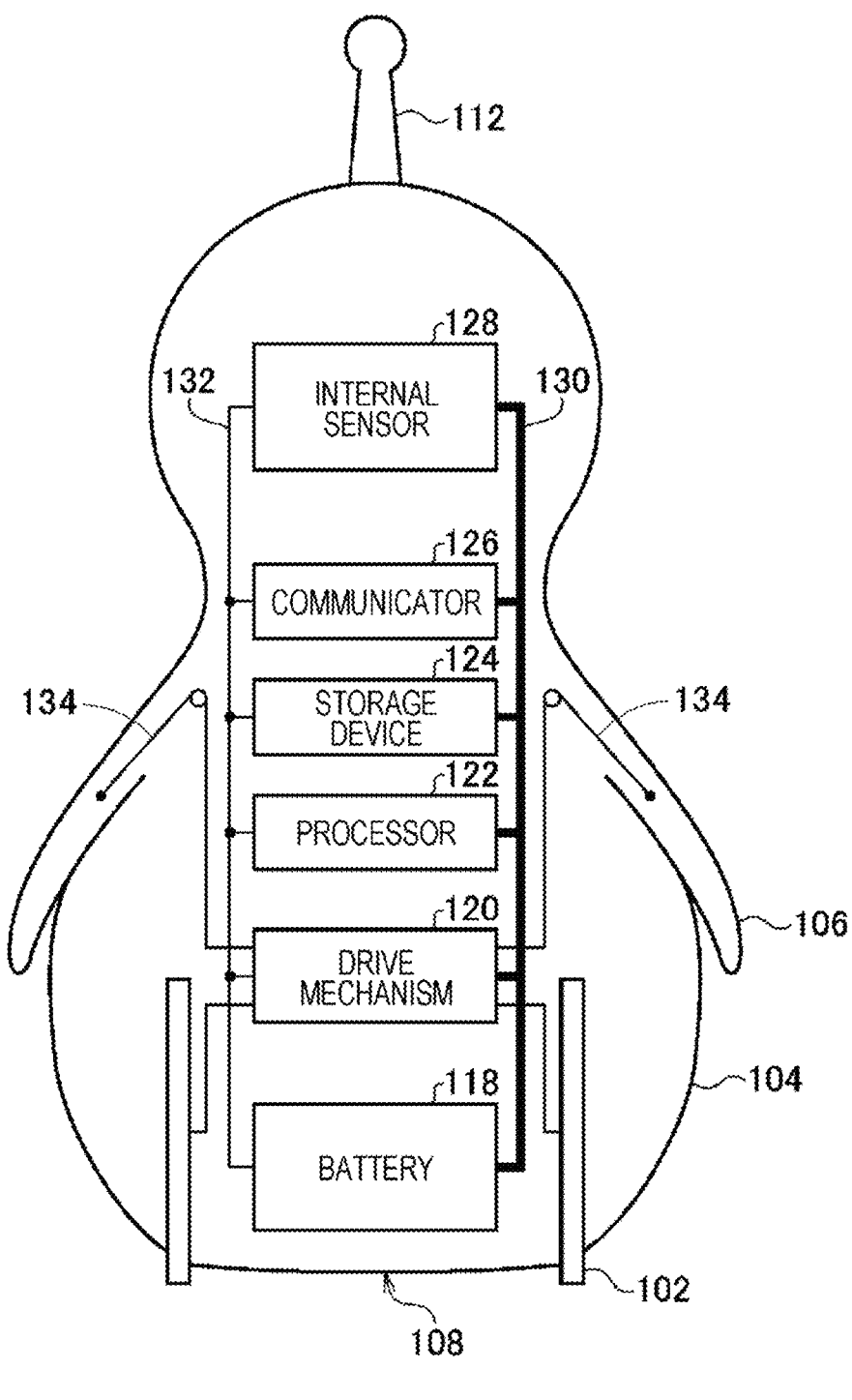
FIG. 9 is a hardware configuration diagram of the robot.

FIG. 9 is a hardware configuration diagram of the robot 100.

The robot 100 includes an internal sensor 128, a communicator 126, a storage device 124, a processor 122, a drive mechanism 120, and the battery 118. The drive mechanism 120 includes the aforementioned connecting mechanism 333 (the linking mechanisms 361 to 363) and wheel drive 370. The processor 122 and the storage device 124 are, included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera (whole-sky camera, high resolution camera), a microphone array, a distance sensor (infrared sensor), a thermosensor, a touch sensor, an acceleration sensor, a smell sensor, and the like. The touch sensor is installed between the outer skin 314 and the main body frame 310, and detects a touch by a user based on a change in electrostatic capacitance. The smell sensor is an already known sensor that applies a principle that electrical resistance changes in accordance with an adsorption of molecules that form a source of a smell.

The communicator 126 is a communication module that carries out wireless communication with the server 200 and various kinds of external device, such as the external sensor 114 or a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls the internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls movement of a wheel (the front wheel 102) and the head portion (the head portion frame 316). The drive mechanism 120 causes a direction of movement and a movement speed of the robot 100 to change by causing the rotational speed and the direction of rotation of each of the two front wheels 102 to change. Also, the drive mechanism 120 can also raise and lower the wheels (the front wheels 102 and the rear wheel 103). When the wheels rise, the wheels are completely stored in the body 104, and the robot 100 comes into contact with the floor surface F via the seating face 108, taking on the sitting state. Also, the drive mechanism 120 controls the arm 106 via the wire 134.

Figure 10:
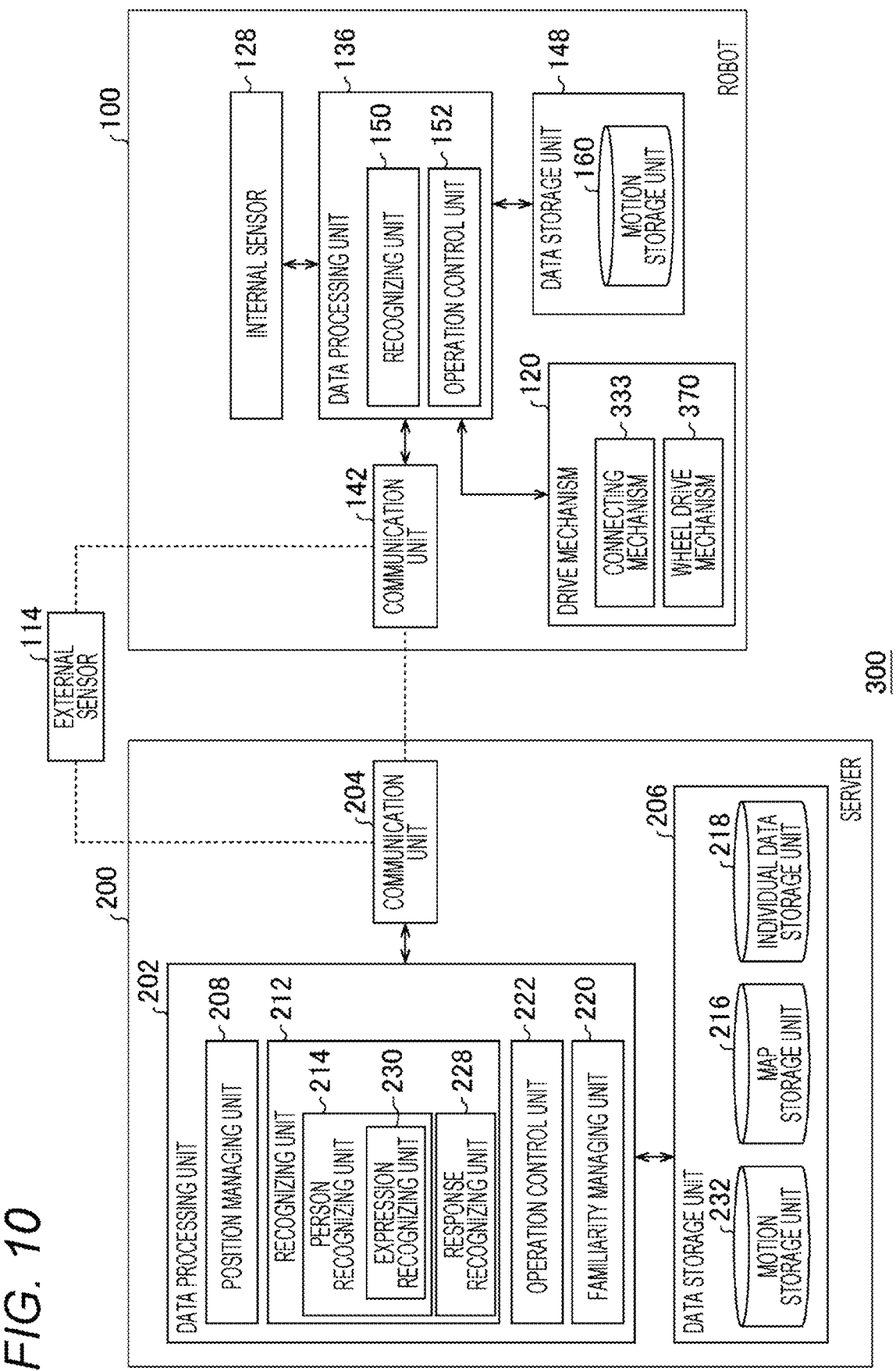
FIG. 10 is a functional block diagram of the robot system.

FIG. 10 is a functional block diagram of the robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218. The robot 100 has a multiple of operation patterns (motions). Various motions, such as waving the arm 106, approaching a user while meandering, and staring at a user with the head to one side, are defined.

The motion storage unit 232 stores a "motion file" that defines control details of a notion. Each notion is identified by motion ID. The motion file is also downloaded into a motion storage unit 160 of the robot 100. Which motion is to be executed may be determined by the server 200, or may be determined by the robot 100. Many motions of the robot 100 are configured as compound motions that include a multiple of unit motions.

In addition to an action map that defines an action of the robot that accords with a situation, the map storage unit 216 also stores a map showing a disposition state of an obstacle such as a chair or a table. The individual data storage unit 216 stores information on a user. Specifically, the individual data storage unit 218 stores familiarity with respect to a user, and master information indicating physical characteristics and behavioral characteristics of the user. The individual data storage unit 218 may also store other attribute information such as age and gender.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a recognizing unit 212, an operation control unit 222, and a familiarity managing unit 220. The position managing unit 208 identifies the positional coordinates of the robot 100 using the method described using FIG. 8. The position managing unit 208 may also track positional coordinates of a user in real time.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. A recognizing unit 150 of the robot 100 acquires various kinds of environmental information using the internal sensor 128, and transmits the environmental information to the recognizing unit 212 of the server 200 after carrying out a primary processing.

The recognizing unit 212 further includes a person recognizing unit 214 and a response recognizing unit 228. The person recognizing unit 214 determines what person a filmed user corresponds to by comparing a feature vector extracted from an image filmed by the camera incorporated in the robot 100 and a feature vector of a user (cluster) registered in advance in the individual data storage unit 218 (a user identification process). The person recognizing unit 214 includes an expression recognizing unit 230. The expression recognizing unit 230 infers an emotion of a user by carrying out image recognition of an expression of the user.

The response recognizing unit 228 recognizes various responsive actions performed with respect to the robot 100, and classifies the actions as pleasant or unpleasant actions. Also, the response recognizing unit 228 recognizes a responsive action of a user with respect to an action of the robot 100, thereby classifying the responsive action as a positive or negative response. Pleasant and unpleasant actions are distinguished depending on whether a responsive action of a user is pleasant or unpleasant for an animal.

The operation control unit 222 determines a motion of the robot 100 in cooperation with an operation control unit 152 of the robot 100. The operation control unit 222 compiles a movement target point of the robot 100, and a movement route for the movement target point. The operation control unit 222 compiles a multiple of movement routes, and having done so, may select any of the movement routes. The operation control unit 222 selects a motion of the robot 100 from a multiple of motions of the motion storage unit 232.

The familiarity managing unit 220 manages familiarity for each user. Familiarity is registered as one portion of individual data in the individual data storage unit 213. When a pleasant action is detected, the familiarity managing unit 220 increases familiarity with respect to that user. When an unpleasant action is detected, familiarity decreases. Also, familiarity of an owner who has not been visually recognized for a long period gradually decreases.

Robot 100

The robot 100 includes a communication unit 142, a data processing unit 136, a data storage unit 148, the internal sensor 128, and the drive mechanism 120. The communication unit 142 corresponds to the communicator 126 (refer to FIG. 9), and manages a process of communicating with the external sensor 114, the server 200, and another robot 100. The data storage unit 148 stores various kinds of data. The data storage unit 148 corresponds to the storage device 124 (refer to FIG. 9). The data processing unit 136 executes various kinds of process based on data acquired by the communication unit 142 and data stored in the data storage unit 143. The data processing unit 136 corresponds to the processor 122 and a computer program executed by the processor 122. The data processing unit 136 also functions as an interface of the communication unit 142, the internal sensor 128, the drive mechanism 120, and the data storage unit 143.

The data storage unit 148 includes the motion storage unit 160, which defines various kinds of motion of the robot 100. Various kinds of motion file are downloaded from the motion storage unit 232 of the server 200 into the motion storage unit 160. A motion is identified by motion ID. An operating timing, an operating time, an operating direction, and the like, of the various kinds of actuator (the drive mechanism 120) are defined chronologically in a motion file in order to perform various motions.

Various kinds of data may also be downloaded from the map storage unit 216 and the individual data storage unit 218 into the data storage unit 148.

The data processing unit 136 includes the recognizing unit 150 and the operation control unit 152. The recognizing unit 150 analyzes external information obtained from the internal sensor 128. The recognizing unit 150 is capable of visual recognition (a visual unit), smell recognition (an olfactory unit), sound recognition (an aural unit), and tactile recognition (a tactile unit).

The recognizing unit 150 regularly films an exterior using the incorporated whole-sky camera, and detects a moving object such as a person or a pet. The recognizing unit 150 extracts a feature vector from a filmed image of a moving object. As heretofore described, a feature vector is a collection of parameters (feature quantities) indicating physical characteristics and behavioral characteristics of a moving object. When a moving object is detected, physical characteristics and behavioral characteristics are also extracted from a smell sensor, an incorporated highly directional microphone, a temperature sensor, and the like. These characteristics are also quantified, forming a feature vector component.

The familiar it managing unit 220 of the server 200 changes the familiarity toward a user in accordance with a responsive action recognized by the recognizing unit 150. In the familiarity toward a user who carries out a pleasant action increases, while the familiarity toward a user who carries out an unpleasant action decreases.

The operation control unit 152 decides a direction of movement of the robot 100 together with the operation control unit 222 of the server 200. A movement based on an action map may be determined by the server 200, and an instantaneous movement such as avoiding an obstacle may be determined by the robot 100. The drive mechanism 120 causes the robot 100 to head toward a movement target point by driving the front wheels 102 (the wheel drive mechanism 370) in accordance with an instruction from the operation control unit 152.

The operation control unit 152 decides a motion of the robot 100 in cooperation with the operation control unit 222 of the server 200. One portion of motions may be determined by the server 200, and other motions may be determined by the robot 100. Also, a configuration may be such that although the robot 100 determines a motion, the server 200 determines a motion when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 152 instructs the drive mechanism 120 to execute a selected motion. The drive mechanism 120 controls each actuator in accordance with a motion file. When an operation of the head portion is defined in the notion file, the operation control unit 152 executes control of the operation by driving the connecting mechanism 333.

The operation control unit 152 can also execute a motion of holding up both arms 106 as a gesture asking for "a hug" when a user with a high degree of familiarity is nearby, and can also perform a motion of no longer wanting to be hugged by causing the left and right front wheels 102 to alternately and repeatedly rotate in reverse and stop in a housed state when bored of the "hug". The drive mechanism 120 causes the robot 100 to perform various motions by driving the front wheels 102, the arm 106, and the neck (the head portion frame 316) in accordance with an instruction from the operation control unit 152.

Next, a characteristic configuration and operations of the robot 100 will be described.

Figures 11A, 11B, 11C:
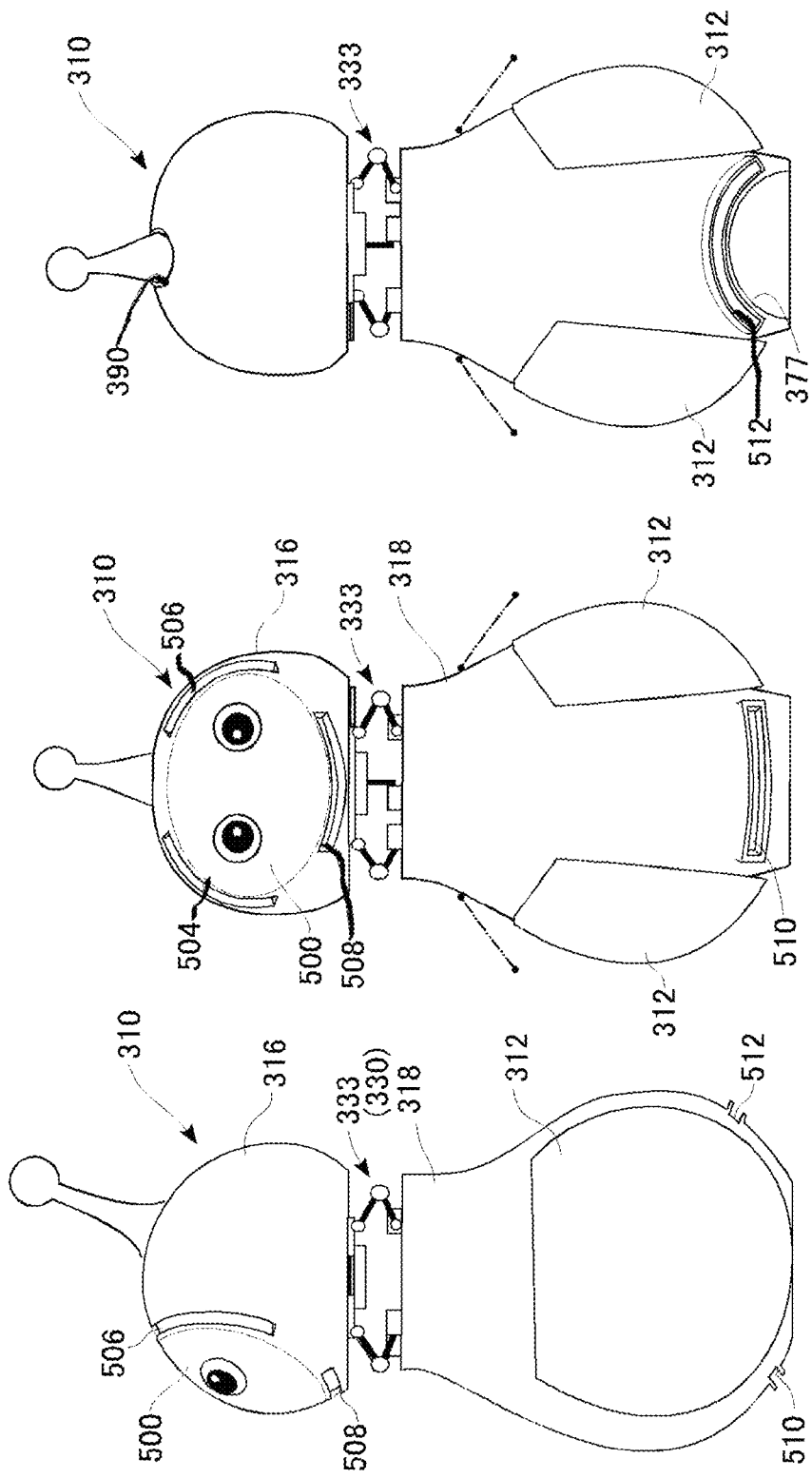
FIGS. 11A to 11C are drawings representing a state wherein an outer skin is removed from the robot.

FIGS. 11A to 11C are drawings representing a state wherein the outer skin 314 is removed from the robot 100. FIGS. 12A to 12c are drawings representing a state wherein the outer skin 314 is mounted on the robot 100. In each drawing, A is a right side view, B is a front view, and C is a back view. The external appearance of the robot 100 has practically bilateral symmetry.

As shown in FIGS. 11A to 11C, the connecting mechanism 333 is interposed between the head portion frame 316 and the trunk portion frame 318. As heretofore described, the head portion load is canceled by the torsion spring 349 being provided (refer to FIG. 3B), because of which the head portion frame 316 is held in a predetermined position above the trunk portion frame 318, ever, when the connecting mechanism 333 is not driven.

A multiple of fitting grooves for partially fitting the outer skin 314 in are provided in each of the head portion frame 316 and the trunk portion frame 318. That is, arc form fitting grooves 504, 506, and 508 are provided so as to enclose the facial region 500 in the front face of the head portion frame 316. Meanwhile, an elongated fitting groove 510 is provided in a front face lower portion of the trunk portion frame 318, and an arc form fitting groove 512 is provided in a back face lower end portion. A housing port 377 for housing the rear wheel 103 is provided in a back face lower portion of the trunk portion frame 318, and the fitting groove 512 is formed in a periphery of the housing port 377.

As shown in FIGS. 12A to 12C, the outer skin 314 is mounted so as to cover the main body frame 310. A circular aperture portion 502 for exposing a facial region 500 of the head portion frame 316 is provided in an upper front face of the outer skin 314. The outer skin 314 extends to a front face side and a back face side of the robot 100, and is also fixed to the trunk portion frame 318. In the embodiment, the wheel cover 312 is exposed, but this may be covered by the outer skin 314.

The outer skin 314 is configured by an outer face of a base material having elasticity being covered with an outer skin layer, and is formed of a soft material that feels good to touch all over. The outer skin 314 includes a bag form portion 524 covering the head portion frame 316, a pair of arm portions 526 extending downward from left and right side faces of the bag form portion 524, an extended portion 528 extending downward from a front face of the bag form portion 524, and an extended portion 530 extending downward from a back face of the bag form portion 524.

The aperture portion 502 is formed in the front face of the bag form portion 524, and the aperture portion 390 is formed in an apex portion. Arc form fitting members 534, 536, and 538 are provided on an inner face of the bag form portion 524 so as to enclose the aperture portion 502. Meanwhile, an elongated fitting member 540 is provided on a lower portion inner face of the extended portion 528, and an arc form fitting member 542 is provided on a lower portion inner face of the extended portion 530.

The fitting members 534 to 533 have shapes complementary with the fitting grooves 504 to 508 respectively of the head portion frame 216. The fitting members 540 and 542 have shapes complementary with the fitting grooves 510 and 512 respectively of the trunk portion frame 218. The fitting members 534 to 542 are formed of a hard material such as a resin, and the outer skin 314 is fixed to the main body frame 310 by the fitting members 534 to 542 being fitted into the fitting grooves 504 to 512 respectively.

When the main body frame 310 is covered with the outer skin 314, a contact region (close contact region) is created between the two. A head portion contact region 550, an abdominal portion contact region 552, and a back portion contact region 554 are shown in the same drawing. The main body frame 310 and the outer skin 314 are in close contact with each other in these contact regions. However, as there is pivoting of the head portion and extension and contraction of the neck portion, a three-dimensional transformation occurs among the contact regions of the outer skin 314. In other words, because the contact regions exist, twisting or stretching is liable to occur among the contact regions. In the embodiment, an increased elasticity region, wherein elasticity is partially increased, is provided among the contact regions of the outer skin 314 in order that no impediment to an operation of the robot 100 occurs even when this kind of twisting or stretching occurs. The increased elasticity region is set in a portion subjected to considerable tensile stress, compressive stress, torsional stress, or shearing stress in accompaniment to an operation of the robot 100.

That is, an increased elasticity region 556 is provided between the head portion contact region 550 and the abdominal portion contact region 552 in the base material, and an increased elasticity region 558 is provided between the head portion contact region 550 and the back portion contact region 554. The outer skin 314 is in close contact with each of the head portion frame 316 and the trunk portion frame 318 in a position distanced from an increased elasticity region. Also, extension and contraction accompanying an operation of the arm 106 is also needed in the arm portion 526, because of which an increased elasticity region 560 is provided. The increased elasticity regions 556 to 560 are provided so as to cover the connecting mechanism 333 from the outer side, whereby elasticity in a position corresponding to the connecting mechanism 333 in the outer skin 314 is increased.

The base material is formed of a porous foam material (urethane sponge in the embodiment). Each increased elasticity region is configured by a large number of apertures being optimally disposed in a corresponding region in the base material. Each aperture penetrates each corresponding region in a thickness direction of the base material. Owing to this kind of aperture being provided, force needed for transformation is less than when no aperture is provided. As a result of this, a driving force needed for an operation of the head portion frame 316 can be reduced. That is, the connecting mechanism 333 (the linking mechanisms 361 to 363) can be driven smoothly. Also, owing to apertures being provided in the base material, wrinkles (a wavy state) accompanying a transformation are unlikely to occur.

FIGS. 13A to 13D to FIGS. 15A to 15E are illustrations schematically representing an operation of the robot 100 caused by a drive of the linking structure 330. FIGS. 13A to 13D exemplify an operation of the head portion caused by the linking structure 330. FIGS. 14A to 14D and FIGS. 15A to 15E exemplify an overall operation of the robot 100 accompanying an operation of the head portion. A to D in each drawing show an operation process.

Figure 13A:
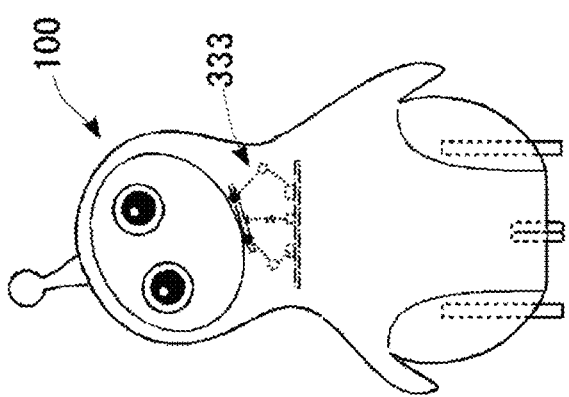
FIGS. 13A to 13D are illustrations schematically representing an operation of the robot caused by a drive of the linking structure.
Figure 13B:
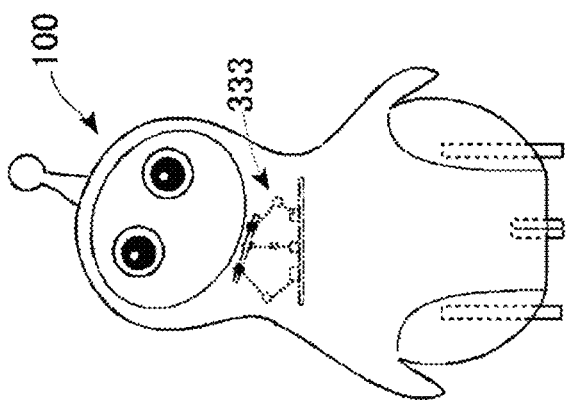

As already described, an operation of contracting the neck portion of the robot 100, as shown in FIG. 13A, can be realized by driving the connecting mechanism 333 (the linking structure 330) as shown in FIGS. 5A to 5D. An operation of extending the neck portion of the robot 200, as shown in FIG. 13E, can be realized by driving the connecting mechanism 333 as shown in FIGS. 4A to 4D. When carrying out these operations, the operation control unit 152 executes a "first control" of driving in a direction that causes the head portion to approach or move away from the trunk portion.

Figure 13C:
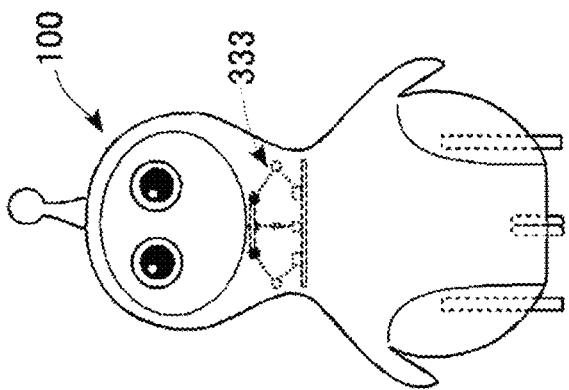
Figure 13D:
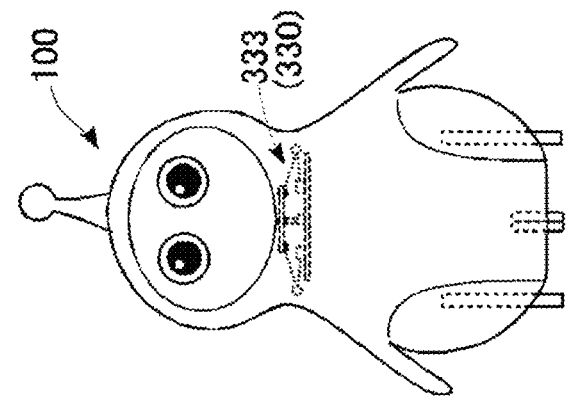

An operation of tilting the head portion of the robot 100 to the left or right, as shown in FIGS. 13C and 13D, can be realized by driving the connecting mechanism 333 as shown in FIGS. 7A to 7D. When carrying out this operation, the operation control unit 152 executes a "second control" of causing the head portion to pivot around the roll shaft. By combining these kinds of operation, the robot 100 can be caused to perform a comical movement.

For example, a rhythmical movement can be realized by repeating an extension and a contraction of the neck portion while causing the robot 100 to travel, as shown in FIGS. 14A to 14D. Also, a comical and cute movement can be realized by repeating a movement of tilting the neck portion left and right (specifically, repeating an operation such as C→B→A→B→C→D→E→D→C→B and so on) while causing the robot 100 to travel, as shown in FIGS. 15A to 15D. When carrying out these operations, the operation control unit 152 executes the first control and the second control simultaneously or consecutively by driving the connecting mechanism 333, while controlling the movement of the robot 100 by driving the wheel drive mechanism 370.

Heretofore, the linking structure 330 of the robot 100, and operations thereof, have been described based on an embodiment. According to the embodiment, a distinctive movement of the robot 100 can be realized using a simple configuration wherein the three linking mechanisms 361 to 363 are provided in parallel, and a combination of a hinge joint and a universal joint is employed for joint portions thereof. That is, an extending and contracting action of the neck portion can be caused to be carried out along the axial line of the trunk portion by the motor rotary shaft and the hinge joint pivot shaft positioned one at either end of the drive link being in parallel. Furthermore, a nodding action or a head tilting action can be realized, without interfering with an extending and contracting action of the neck portion, by the driven link and the second base being connected via a universal joint. This is an action in keeping with the skeletal structure of a living being, and can convey a natural impression to a user, with no feeling of strangeness. In particular, the aforementioned comical and cute movement can also be realized by an extension and contraction of the neck portion and a rolling of the head portion being carried out simultaneously or consecutively, which is expected to cause a user to feel affection. It is also thought that this will increase the market value of the robot 100 like that of a pet.

Also, by pivoting of the head portion caused by the linking structure 330 being limited to rolling and pitching, and a separate actuator (the motor 354) being provided for yawing, simplification and operational stability of the linking structure 330 can be achieved. Simplification and stability of control of the linking structure 330 can also be achieved.

Furthermore, by providing the soft outer skin 314 so as to cover the connecting mechanism 333 (the linking mechanisms 361 to 363) from the outer side, the connecting mechanism 333 can be prevented from interfering with a user. A user, rather than hesitating to touch the robot 100, eagerly touches the robot 100 owing to the good tactile sensation of the outer skin 314. Also, even though this kind of outer skin 314 is provided, a portion of the outer skin 314 that covers the connecting mechanism 333 is an increased elasticity region, because of which the outer skin 314 can be restricted from forming resistance to an operation of the head portion.

The invention not being limited to the heretofore described embodiment and modifications, components can be modified and embodied without departing from the scope of the invention. Various inventions may be formed by combining a multiple of components disclosed in the heretofore described embodiment and modifications as appropriate. Also, some components from among all components presented in the heretofore described embodiment and modifications may be omitted.

In the heretofore described embodiment, a configuration wherein the first base 331 is attached to the trunk portion frame 318, and the motors 344 to 348 are installed on the first base 331 is given as an example. In a modification, one portion of the trunk portion 318 may be adopted as a first base, and the motors 344 to 348 fixed directly to the trunk portion frame 318.

In the heretofore described embodiment, the connecting mechanism 333 is configured of three linking mechanisms. In a modification, a connecting mechanism may be configured of four or more linking mechanisms. Note that in terms of realizing translation in one axial direction (the direction) and pivoting (rolling and pitching) around two shafts, three linking mechanisms, as in the heretofore described embodiment, are quite sufficient, and can be said to be optimal for realizing the mechanism simply.

The heretofore described embodiment shows ah example wherein the torsion spring 349 is provided along the rotary shafts of the motors 344 to 348 in order to cancel a load between the head portion and the trunk portion (cancel a load exerted by the weight of the head portion). In a modification, a load may be canceled by a spring (a coil spring, a plate spring, or the like) being interposed between, for example, the second base 332 and the first base 331. That is, not being limited to the rotary shaft of each actuator, a load canceling spring may be provided between a first region and a second region.

Although one aspect of a robot has been shown in the heretofore described embodiment, the heretofore described linking structure is also applicable to another humanoid robot, a pet robot, or the like. Not being limited to a head portion and a trunk portion, a "first region" and a "second region", such as a trunk portion and an arm portion, may be set with a connecting portion (a joint or the like) of the robot as a boundary. Further, the hereto ore described linking mechanism may be applied between the two regions. Also, the heretofore described linking structure may be applied to a chair, a leg portion of a table, an arm portion of a lampstand (a reading lamp or the like), a region accompanying a physical operation in a Round One type arcade game, or the like.

In the heretofore described embodiment, an example wherein a connecting mechanism is realized by a linking mechanism is shown. In terms of realizing the aforementioned comical movement, this may be mainly realized using control, and is not limited to the aforementioned kind of mechanism. For example, a multiple of motors for realizing each pivoting (rolling and pitching) around two shafts may be provided separately. Alternatively, the aforementioned translation in one axial direction and pivoting around two shafts may be realized by disposing a multiple of hydraulic pistons instead of a multiple of linking mechanisms, and controlling a stroke of each piston. Alternatively, a solenoid or other actuator may be employed. Even when this kind of configuration is employed, the aforementioned first and second controls can be executed.

Although not mentioned in the heretofore described embodiment, an outer skin may be configured by a cloth material having elasticity being disposed on a surface of a base material. By so doing, a porous portion of the base material becomes unnoticeable, and the tactile sensation can be further improved. As a structure for disposing the cloth material on the surface of the base material, the structure may be formed by fabricating a bag with the cloth material in accordance with the form of the base material, and enveloping the base material in the bag.

A configuration wherein the bag form portion 524 is provided in the outer skin 314, and caused to engage by covering the head portion frame 316 therewith, is presented as an example in the heretofore described embodiment. In a modified example, a portion of an outer skin that is not of a bag form may be caused to engage by hooking the portion onto a predetermined place (an end portion or the like) on a main body frame, and tension may be applied to an extended portion with the engagement portion as a fulcrum. The "engagement portion" may include various structures, such as a fitting structure or a hooking structure. It is sufficient that a "bag form portion" is of a structure that engages with a specific region (one portion) of a robot by the specific region being covered with the bag form portion, and is supported by the specific region.

Although not mentioned in the heretofore described embodiment, an increased elasticity region may be realized by configuring so that the thickness of a predetermined region of the base material is relatively small. Also, the base material may be configured in a layered form, and a difference may be provided in a thickness direction between an increased elasticity region and another region.

In the heretofore described embodiment, a base material of an outer skin is formed of a urethane sponge, but another sponge, such as a rubber sponge, may be employed. A rubber sponge can be obtained by, for example, kneading a foaming agent, a softening agent, or the like, into rubber and vulcanizing.

In the heretofore described embodiment, a base material formed of a porous foam material is employed as the base material of the outer skin, but another material having elasticity may be employed. For example, a base material may be formed of an elastic body such as rubber. Note that a soft, porous material such as sponge is preferable in terms of restricting a load for elasticity, and restricting resistance to an operation of the robot.

In the heretofore described embodiment, a description has been given centered on movement of the head portion, but a still more dynamic and comical action may be realized by changing positions to which the left and right front wheels 102 are raised or lowered. That is, the robot 100 may include a mechanism that causes the front wheels 102 to rise or descend. By so doing, the robot 100 can also tilt the whole of the body 104 to the right or left by controlling the elevating mechanism 30 that the positions to which the left and right front wheels 102 are raised or lowered deviate. Also, the robot 100 may adjust the positions to which the left and right front wheels 102 are raised or lowered so that the body 104 inclines to the right side when turning to the right side while traveling, and may adjust the positions to which the left and right front wheels 102 are raised or lowered so that the body 104 inclines to the left side when turning to the left side. By adjusting the raised or lowered state of the left and right front wheels 102 in addition to movement of the head portion in this way, a more dynamic and comical movement can be realized.

Figure 16A:
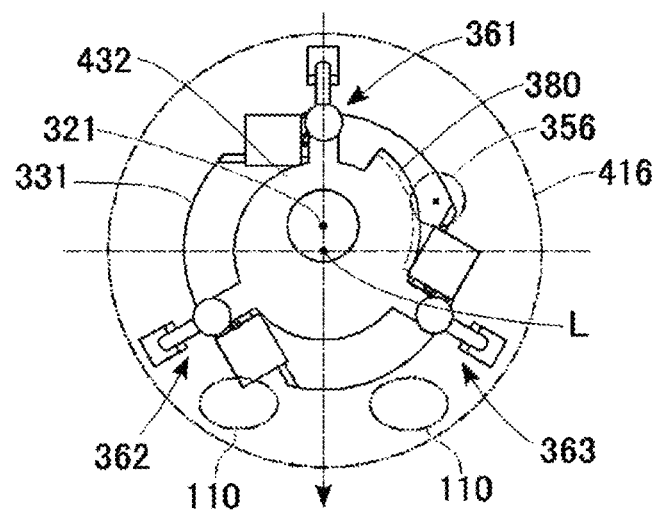
FIGS. 16A to 16C are illustrations representing a linking structure, and an operation thereof, according to a modification.
Figure 16B:
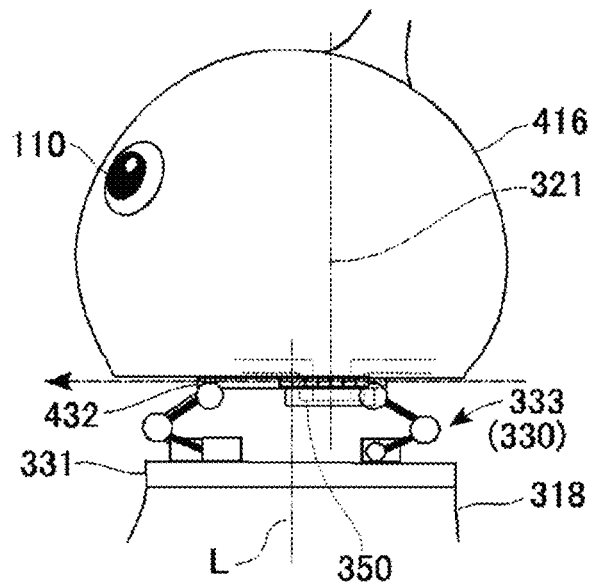
Figure 16C:
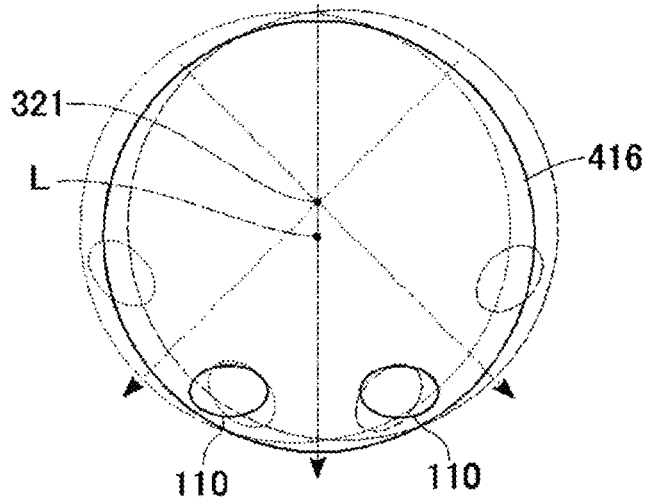

FIGS. 16A to 16c are illustrations representing a linking structure, and an operation thereof, according to a modification. FIG. 16A is a plan view. FIG. 16B is a side view representing a linking structure periphery. FIG. 16C is a plan view schematically representing an action of a head portion caused by the linking structure. Arrows in the drawings represent a frontward direction as seen from a robot.

In the heretofore described embodiment, the axial line L of the first base 331 and the yaw shaft 321 are caused to coincide, as shown in FIG. 3E. The axial line L is the axial line of the head portion frame 316, and is also the central axis of the connecting mechanism 333. The second base 332 comes into proximity to or moves away from the first base 331 by being displaced along the axial line L, whereby an extending and contracting action of the neck portion is realized.

In the modification, the yaw shaft 321 is caused to deviate from the axial line L, becoming eccentric with respect to a center of a head portion frame 416, as shown in FIGS. 16A and 16B. Specifically, the yaw shaft 321 is caused to deviate to behind the axial line L. Together with this, a fitting portion of the head portion frame 416 and a second base 432 (that is, the position of the pivot shaft 350) and a center of a pitch circle of the gear 380 also deviate to behind the axial line L in accordance with the yaw shaft 321.

According to this kind of configuration, behavior of the head portion when the robot looks back to the left or right can be brought nearer to that of a living being, and made to appear more natural. That is, in the heretofore described embodiment shown in FIG. 3B, the head portion frame 316 pivots around a central axis thereof, because of which no deviation occurs between the head portion and the trunk portion when performing an action of looking back, and there is a possibility of the action appearing unnatural as animal-like behavior. With regard to this point, according to the embodiment, the yaw shaft 321 of the head portion frame 416 deviates from the central axis, as shown in FIG. 16C, because of which a deviation can be caused to occur between the head portion and the trunk portion when performing an action of looking back. A moderate degree of transformation can also be caused to occur in the outer skin 314. Because of this, the action can be brought nearer to animal-like behavior.

In the modification too, the outer skin 314 is provided so as to cover the connecting mechanism 333, whereby the connecting mechanism 333 can be prevented from interfering with a user. Also, by connecting the first base 331 and the second base 332 so as to be able to approach and move away from each other, a comical movement can be realized.

An example wherein the first joint 374 is a single axis hinge joint and the second joint 376 is a universal joint is shown in the heretofore described embodiment. In a modification, the kind and combination of joints may be changed as appropriate, such as by universal joints being adopted for both the first joint 374 and the second joint 376.

The invention claimed is:

1. A robot comprising:
   a first region;
   a second region;
   a first base fixed to the first region;
   a second base fixed to the second region;
   a connector connecting the first base and the second base, wherein the connector is movable to change a distance between the first base and the second base, and the connector comprises:
      a pivot shaft parallel to a central axis of the connector, wherein the central axis extends through the first base and the second base, the pivot shaft is spaced from a center point of the connector at the second base, and the second base is configured to pivot about the pivot shaft; and
   a driver configured to drive the connector, wherein the driver comprises at least one motor.

2. The robot according to claim 1, wherein the pivot shaft is a yaw shaft of the second region.

3. The robot according to claim 1, further comprising an outer skin covering the first region, the second region and the connector, wherein an elasticity of a first portion of the outer skin corresponding to the connector is greater than an elasticity of a second portion the outer skin.

4. The robot according to claim 1, wherein the driver is configured to drive the connector to move the second base along the central axis.

5. The robot according to claim 1, wherein the connector comprises a plurality of linking mechanisms for adjusting a roll and a pitch of the second region.

6. The robot according to claim 1, further comprising an actuator for pivoting the second base around a rotary shaft to adjust a yaw of the second region.

7. The robot according to claim 1, wherein
   the first region is a trunk portion,
   the second region is a head portion spaced from the first region in a first direction, and
   the pivot shaft is spaced from the central axis in a second direction perpendicular to the first direction.

8. A robot comprising:
   a first region;
   a second region;
   a first base fixed to the first region;
   a second base fixed to the second region;
   a connector connecting the first base and the second base, wherein the connector is configured to adjust a distance between the first base and the second base along a central axis of the connector, and the central axis extends through the first base and the second base; and
   a driver configured to drive the connector, wherein the driver comprises at least one motor; and
   a pivot shaft parallel to the central axis, wherein the second base is configured to pivot around the pivot shaft, and the pivot shaft is parallel to the central axis as a yaw shaft of the second region, and is spaced from a center point of the connector at the second base.

9. The robot according to claim 8, wherein
   the first region is a trunk portion,
   the second region is a head portion spaced from the first region in a first direction, and
   the pivot shaft is spaced from the central axis in a second direction perpendicular to the first direction.

10. The robot according to claim 8, further comprising an outer skin covering the first region, the second region and the connector, wherein an elasticity of a first portion of the outer skin corresponding to the connector is greater than an elasticity of a second portion the outer skin.

11. The robot according to claim 8, wherein the connector comprises a plurality of linking mechanisms for adjusting a roll and a pitch of the second region.

12. The robot according to claim 8, further comprising an actuator for pivoting the second base around a rotary shaft to adjust a yaw of the second region.

13. A robot comprising:
   a head region;
   a body region;
   a first base fixed to the head region;
   a second base fixed to the body region;
   a plurality of connectors connecting the first base and the second base, wherein each of the plurality of connectors is movable to change a distance between the first base and the second base, connectors of the plurality of connectors surround a central axis, and the central axis extends through the first base and the second base;
   a pivot shaft parallel to the central axis, wherein the pivot shaft is spaced from a center point of the connector at the first base, and the second base is configured to pivot about the pivot shaft; and
   a driver configured to drive each connector of the plurality of connectors, wherein the driver comprises at least one motor.

14. The robot according to claim 13, wherein the pivot shaft is a yaw shaft of the head region.

15. The robot according to claim 13, further comprising an outer skin covering the head region, the body region and the plurality of connectors, wherein an elasticity of a first portion of the outer skin corresponding to the plurality of connectors is greater than an elasticity of a second portion the outer skin.

16. The robot according to claim 13, wherein
the driver is configured to drive the plurality of connectors to move the first base along the central axis.

17. The robot according to claim 13, wherein
the driver is configured to drive the plurality of connectors for adjusting a roll and a pitch of the head region.

18. The robot according to claim 13, further comprising an actuator for pivoting the first base around a rotary shaft to adjust a yaw of the head region.

19. The robot according to claim 13, wherein
the head portion is spaced from the body region in a first direction, and
the pivot shaft is spaced from the central axis in a second direction perpendicular to the first direction.

20. The robot according to claim 13, wherein the first base comprises a plurality of projections, and each projection of the plurality of projections is attached to a corresponding connector of the plurality of connectors.

21. The robot according to claim 1, further comprising a gear connected to an outer periphery of the second base, wherein the gear extends around less than an entirety of the second base.

\* \* \* \* \*